(12) United States Patent
Herrick

(10) Patent No.: US 9,816,320 B1
(45) Date of Patent: Nov. 14, 2017

(54) PORTABLE DIRECTIONAL DRILL

(71) Applicant: RODDIE, INC., Columbia Falls, MT (US)

(72) Inventor: Rod Herrick, Whitefish, MT (US)

(73) Assignee: RODDIE, INC., Columbia Falls, MT (US)

( * ) Notice: Subject to any disclaimer, the term of this patent is extended or adjusted under 35 U.S.C. 154(b) by 566 days.

(21) Appl. No.: 14/163,322

(22) Filed: Jan. 24, 2014

(51) Int. Cl.
*E21B 7/04* (2006.01)

(52) U.S. Cl.
CPC ..................................... *E21B 7/04* (2013.01)

(58) Field of Classification Search
CPC . E21B 7/04; E21B 7/046; E21B 7/027; E21B 7/028
See application file for complete search history.

(56) References Cited

U.S. PATENT DOCUMENTS

| | | | | |
|---|---|---|---|---|
| 539,491 | A * | 5/1895 | Snyder ................... | E02F 3/963 173/145 |
| 3,107,738 | A * | 10/1963 | Osborn .................. | E21B 7/046 173/149 |
| 3,554,298 | A | 1/1971 | Klein | |
| 3,679,320 | A * | 7/1972 | Bohorquez ........... | B23B 45/008 408/110 |
| 4,474,252 | A * | 10/1984 | Thompson ............. | E21B 4/14 175/205 |
| 5,205,671 | A | 4/1993 | Handford | |
| 6,109,831 | A | 8/2000 | Handford | |
| 6,959,770 | B2 * | 11/2005 | Clelland ............... | E21B 19/086 173/152 |
| 2007/0235201 | A1 * | 10/2007 | Gharsalli ............... | E02F 3/764 172/4.5 |

FOREIGN PATENT DOCUMENTS

| | | |
|---|---|---|
| EP | 0904461 B1 | 8/2006 |
| WO | 2013/055389 A1 | 8/2013 |

OTHER PUBLICATIONS

Dictionary defintinion of Cantilevered, accessed Mar. 18, 2016 via www.thefreedictionary.com/.*
Dictionary defintinion of Attach, accessed Mar. 18, 2016 via www.thefreedictionary.com/.*
Dictionary defintinion of Brace, accessed Mar. 18, 2016 via www.thefreedictionary.com/.*
Dictionary definition of Cantilevered, accessed Mar. 18, 2016 via www.thefreedictionary.com/.*
Dictionary definition of Attach, accessed Mar. 18, 2016 via www.thefreedictionary.com/.*
Dictionary definition of Brace, accessed Mar. 18, 2016 via www.thefreedictionary.com/.*
Grundopit 40/60 Mini-Directional Drill—marketing brochure by TT Technologies, Inc.,2020 E New York Street, Aurora, IL 60502, dated 2005.

* cited by examiner

*Primary Examiner* — Giovanna C Wright
*Assistant Examiner* — Manuel C Portocarrero
(74) *Attorney, Agent, or Firm* — Robin Kelson Consulting

(57) ABSTRACT

Provided are hand-portable directional drilling devices designed to drill through space underground, particularly for drilling channels underground from within an interior building space. Also provided are improvements in a fixable, positionable metal wrench collar and a drill stem joint breakout system.

23 Claims, 19 Drawing Sheets

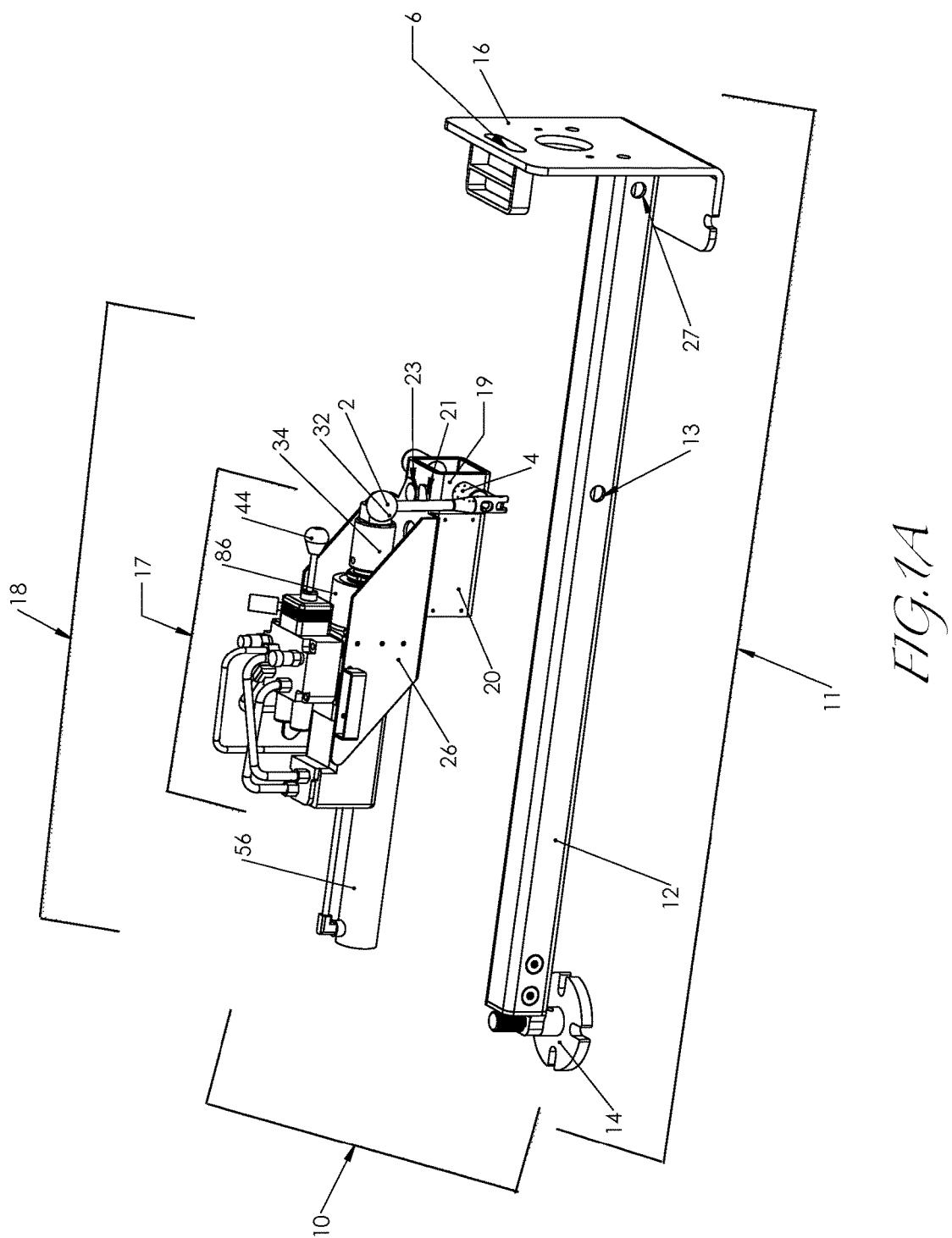

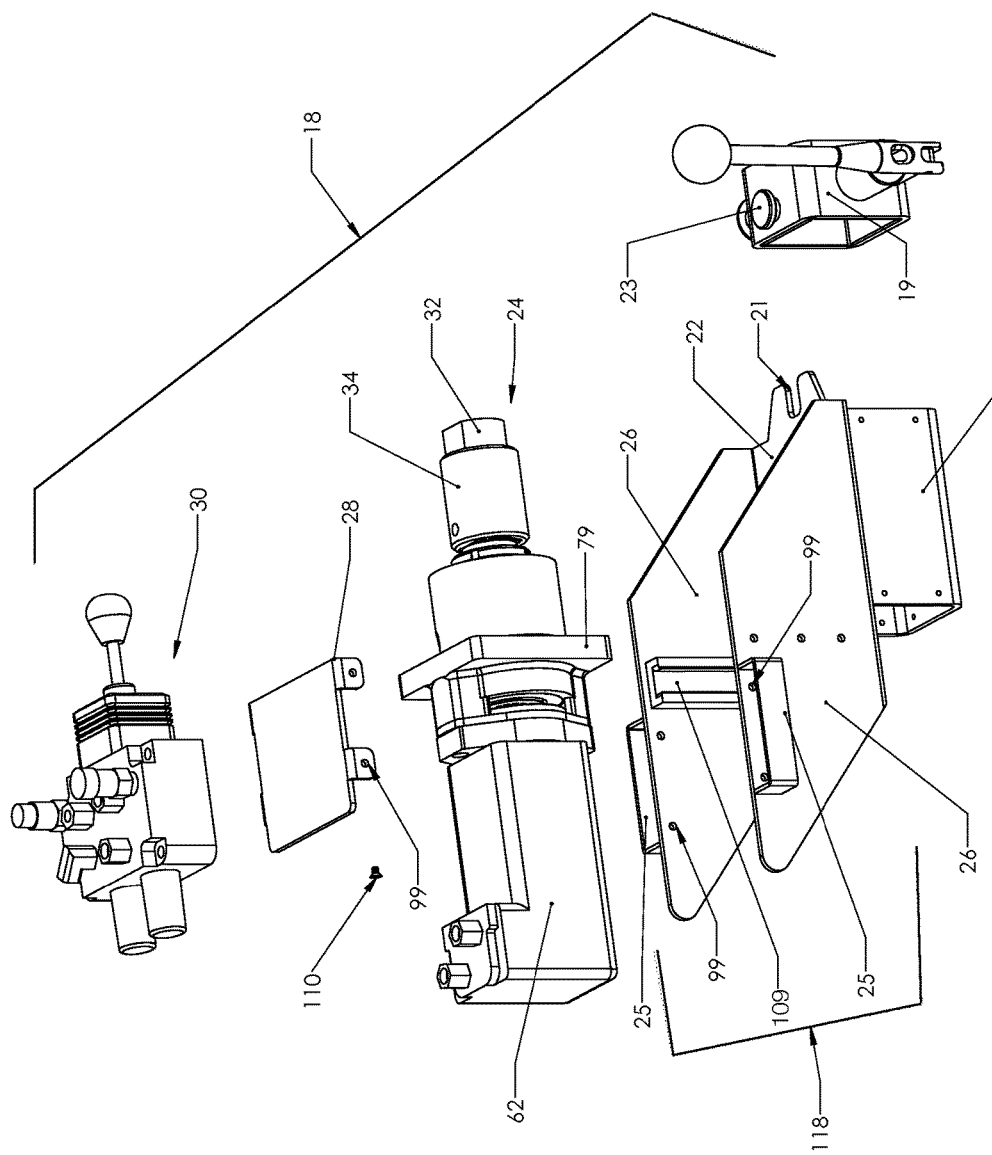

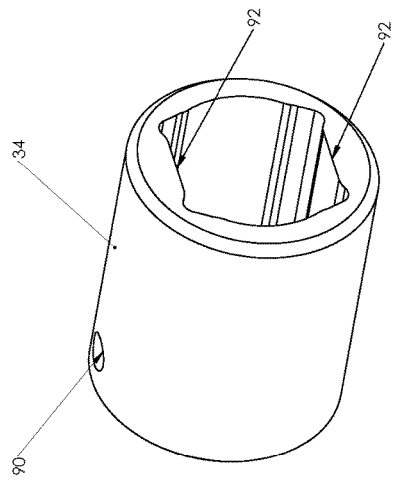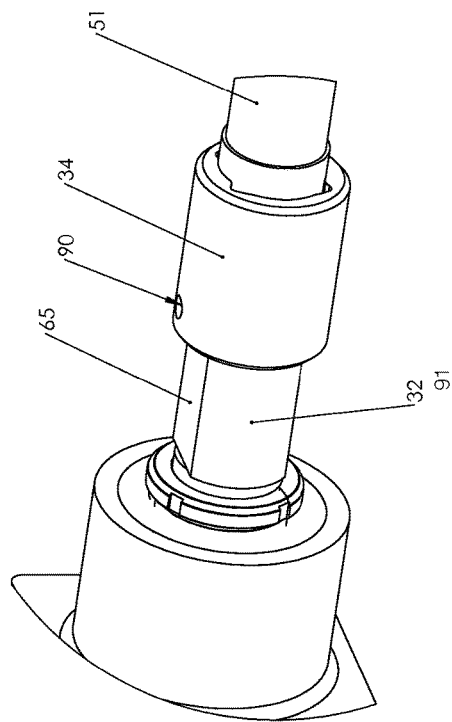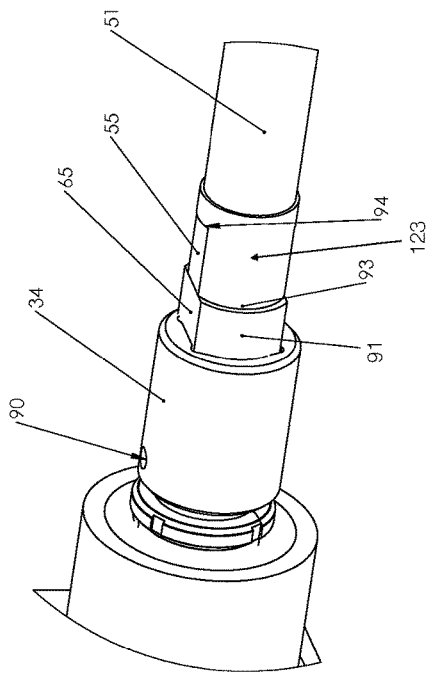

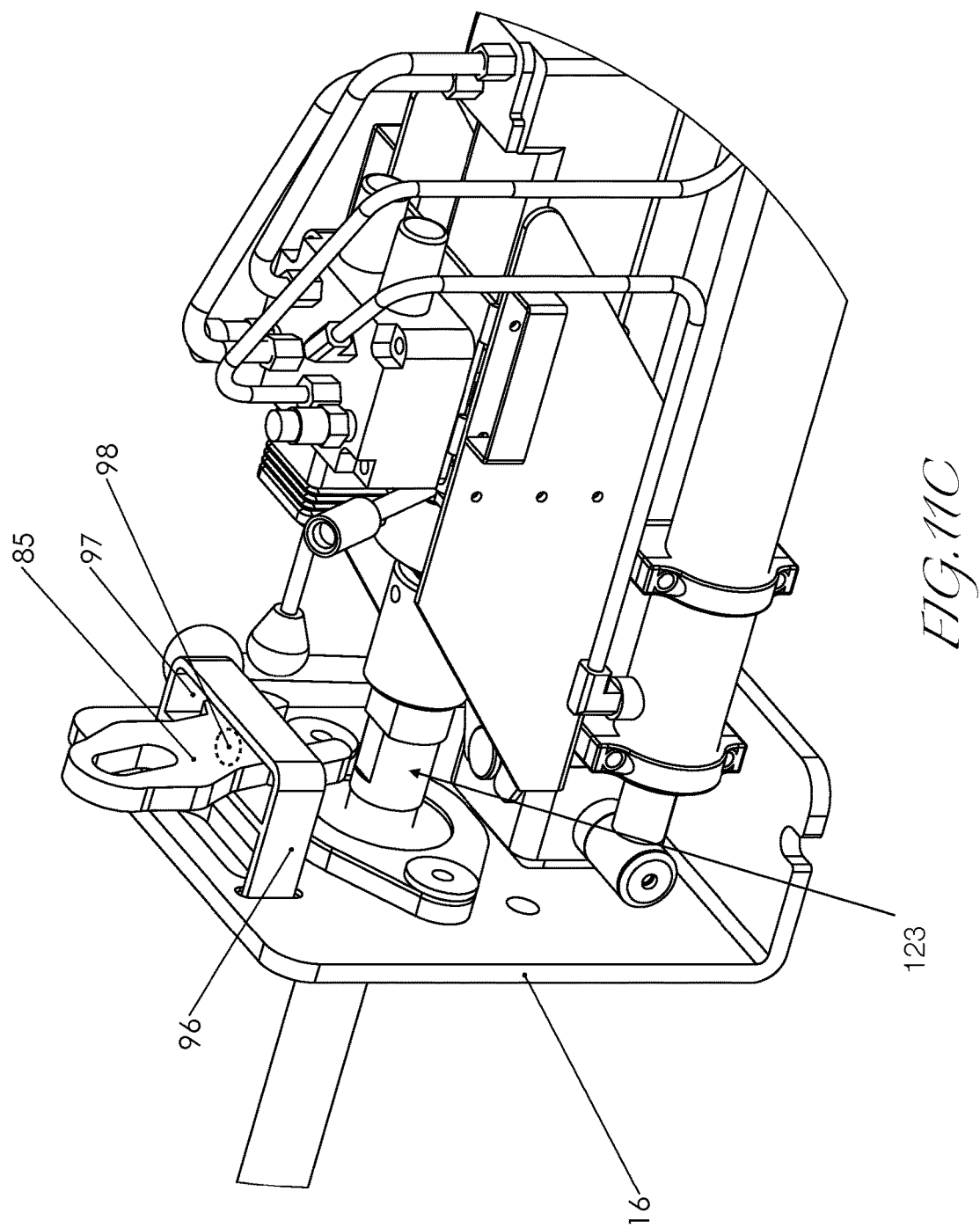

PORTABLE DIRECTIONAL DRILL

FIELD OF USE

Embodiments of the present disclosure find applicability in the field of directional drill systems designed to drill through space underground. One useful field includes systems for drilling channels underground for laying gas, water, sewer or other underground pipes.

BACKGROUND

Directional drilling machines and methods of use are well-known and well-characterized in the art. Also referred to in the art as boring, thrusting or horizontal drilling, the technology allows for the laying of pipe and cable underground (e.g., gas, water, sewer and drain pipes; ducts; power cables, and the like) without needing to excavate or cut open the ground surface along the length of the pipe or cable to be installed. Typically, the process is executed by boring into the ground at an angle to a desired depth, then changing to a horizontal drilling direction. The drill gains its directional ability by means of an angled steering blade in the drill head behind which is a transmitter or locater beacon (e.g., "sonde" or GPS locator) that relays information to an above-ground operator so that drilling height and direction can be manipulated remotely to avoid obstacles and arrive at an intended location. Directional boring machines are generally configured to drive a series of drill rods joined end-to-end to form a drill string. At the drilling destination, an access pit is provided. When the drill head penetrates the access pit wall, the drill head is removed, and the pipe cable is attached to the drill string, optionally behind a rotating reamer head that serves to enlarge the bore as the pipe or cable is being pulled back through the bore by the retracting drill string. Once the pipe or cable is pulled through the bore and is laid, it is connected as desired to the service source and service receiver. Patent publications U.S. Pat. No. 6,109,831; U.S. Pat. No. 5,205,671; U.S. Pat. No. 3,554,298; EP 0 904 461; and WO 2013/055389 are representative of the art.

In the case where directional drilling is desired to deliver cable or pipe to a building basement, currently it is necessary to build an access pit outside the building, adjacent the building basement wall and to a depth where the pipe or cable will be delivered to the building. A hole is then drilled through the basement wall and the pipe or cable passed through this opening. Building access pits outside and adjacent building basements are unattractive and can be difficult to carry out, due to intervening topography or structures. It would be preferable to launch directional drilling from the basement interior itself, and excavate the access or destination pit out at the street or service source, away from building structures. However, current directional drilling machines are large, heavy and cumbersome. Typically, the machines are delivered to their location by trailer, and maneuvered into position on tracks or rollers. The Grundopit 40/60 by TT Technologies, Inc., considered a mini-directional drill suitable for pit launched drilling, weighs 400 lbs. There remains a need for a hand-portable, lightweight mini-directional drill that can be hand-carried into buildings, and has dimensions that accommodate transport up and down stairwells and around building interior corners.

SUMMARY

This summary is provided to introduce a selection of concepts in a simplified form that are further described below in the Detailed Description. This summary is not intended to identify key features of the claimed subject matter on its own, nor is it intended to be used alone as an aid in determining the scope of the claimed subject matter.

In accordance with one embodiment of the present disclosure, a hand-portable directional drill device is provided. In one preferred embodiment, the drill weighs less than 200 lbs. In another preferred embodiment, the drill weighs less than 190 lbs. In still another preferred embodiment, the drill is competent to deliver a drill string underground at least about 200 feet. In still another preferred embodiment, the drill comprises two components that can be disengaged from one another for carrying purposes, each component weighing less than 100 lbs. In yet another embodiment, one component comprises a wall-mountable chassis or frame that consists substantially of a single longitudinal beam attached at one end to a wall mount plate, and the other component comprises a main body that houses a power unit and a rotary drive unit. In still another embodiment, the main body comprises a hydraulic valving system, a hydraulic motor, a rod or stem pipe spinning assembly, and means for coupling with the chassis component. In still another embodiment, the coupling means allows the main body to articulate or slide along the longitudinal axis of the chassis when coupled to it. In still another embodiment, the coupling means comprises a double collar having a first collar portion and a second collar portion. The first collar portion, also referred to herein as a cuff, comprises a retractable pin that can engage pinholes positioned along the chassis frame. In still another embodiment, the power unit comprises a hydraulic cylinder with the anterior end of the piston rod attached to the first collar portion, and the cylinder barrel attached to the second collar portion. In still another embodiment, the chassis frame comprises two pinholes, positioned at locations along the frame body such that when the first collar portion is engaged in one of the pinholes, the second collar portion can be moved forward to meet the first collar portion and retract the piston rod back into the cylinder barrel. In this way, a two-stage directional drilling process can occur.

In still another embodiment, the rod or stem pipe spinning assembly comprises a modified rotary drive assembly with a main shaft or spindle comprising internal splines and contained within the rotary drive housing. In still another embodiment, a rotary drive unit is provided comprising a hydraulic motor directly mounted to a lubricant coupler housing. In still another embodiment, the hydraulic motor is coupled to the housing by means of a spindle or shaft contained within the housing and having internal splines that engage with splines extending the hydraulic motor. In another embodiment, the housing couples directly to a pipe stem adapter by means of the same spindle or shaft, which also has threads adapted to receive and engage the stem pipe adapter. In still another embodiment, the housing comprises a port and cavity for receiving a drill tip lubricant, seals for holding the lubricant, and bearings and bearing guards or oil seals for facilitating rotation of the shaft when powered by the hydraulic motor. In another embodiment, the rod spinning assembly comprises a lubricating housing unit that delivers lubricant through the rod cores to lubricate the drill head without interfering with the rod rotating bearing system.

In accordance with another embodiment of the present disclosure, a multi-staging hand-portable mini-directional drill is provided that can be hand-carried up and down stairs easily and maneuvered around tight spaces. In accordance with another embodiment of the present disclosure, a wall-mountable directional drilling device is provided. In still another embodiment of the present disclosure, the hand-portable directional drill of the present disclosure can be used either as a wall mountable device for use inside a building, or as a pit-launched device for use outside a building.

In accordance with another embodiment of the present disclosure, a hand-portable directional drill competent to drill 1-meter drill stem sections is provided. In one embodiment the hand-portable directional drill detaches into two hand-portable components. In another embodiment each component weighs less than about 100 lbs. In another preferred embodiment, each component weighs less than about 90 lbs. In still another embodiment, the intact hand-portable directional drilling device of the present disclosure weighs less than about 200 lbs.

In accordance with another embodiment of the present disclosure, a magnetized wrench collar is provided as a slidable lock nut. In one embodiment, the magnetized wrench collar acts as a moveable lock nut, or a fixable, repositionable wrench collar that can slide over a stem joint and inhibit unthreading of the joint. In still another embodiment, the joint occurs at the juncture of the drill stem adapter and a member pipe being added to or removed from a drill string. In still another embodiment, the collar comprises at least one magnet, and preferably two diametrically opposed magnets, which have sufficient attractive magnetic force to fix or hold the collar in a desired location, and still allow the collar to be repositioned by hand.

In accordance with another embodiment of the present disclosure, a drill stem joint wrench system is provided for facilitating breakout or cracking open a stem pipe joint. In one embodiment the joint is located between a stem pipe and the stem pipe adapter. In another embodiment, the joint is located between two stem pipes. In a preferred embodiment, the drill stem wrench system comprises a removable wrench component or element and a wrench stop attached to the chassis, more preferably attached to a wall mount plate attached to the chassis, and positioned substantially above the drill bit hole. In still another embodiment the wrench element has means for gripping a drill stem joint member, and the wrench stop comprises means for preventing rotation of the wrench element about the radial axis of the stem joint member. In still another preferred embodiment, the drill stem joint wrench system is magnetized, thereby allowing the wrench component to be both moveable and fixable, for example, removably attached to the chassis as desired.

In accordance with another aspect of the present disclosure, a method for directional drilling from inside a building is provided, as is a method for directional drilling using a hand-portable, wall-mountable directional drill.

In accordance with another aspect of the present disclosure, a method for using a magnetized wrench collar is provided.

In accordance with another aspect of the present disclosure, a method for using an improved drill stem joint wrench breakout system is provided.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 1A-1C illustrate a hand-portable directional drill device in accordance with one embodiment of this disclosure, in both its coupled operational form (FIGS. 1B, 1C) and its uncoupled carrying form (FIG. 1A);

FIG. 2 is an exploded view of a combined power/drive unit component 18 in accordance with one embodiment of the present disclosure;

FIGS. 10A-10O illustrate various positions of a magnetized wrench collar in accordance with one embodiment of the present disclosure;

FIGS. 11A-11C illustrate various positions of a magnetized wrench collar of a hand-portable directional drill device in accordance with one embodiment of this disclosure.

DETAILED DESCRIPTION

Embodiments of the present disclosure provide devices and methods for directional drilling in confined spaces, and more particularly for directional drilling from within a building interior, including a basement space. Also provided are devices and methods for using an improved wrench collar or moveable lock nut and an improved stem joint breakout wrench system.

Figure 1B:
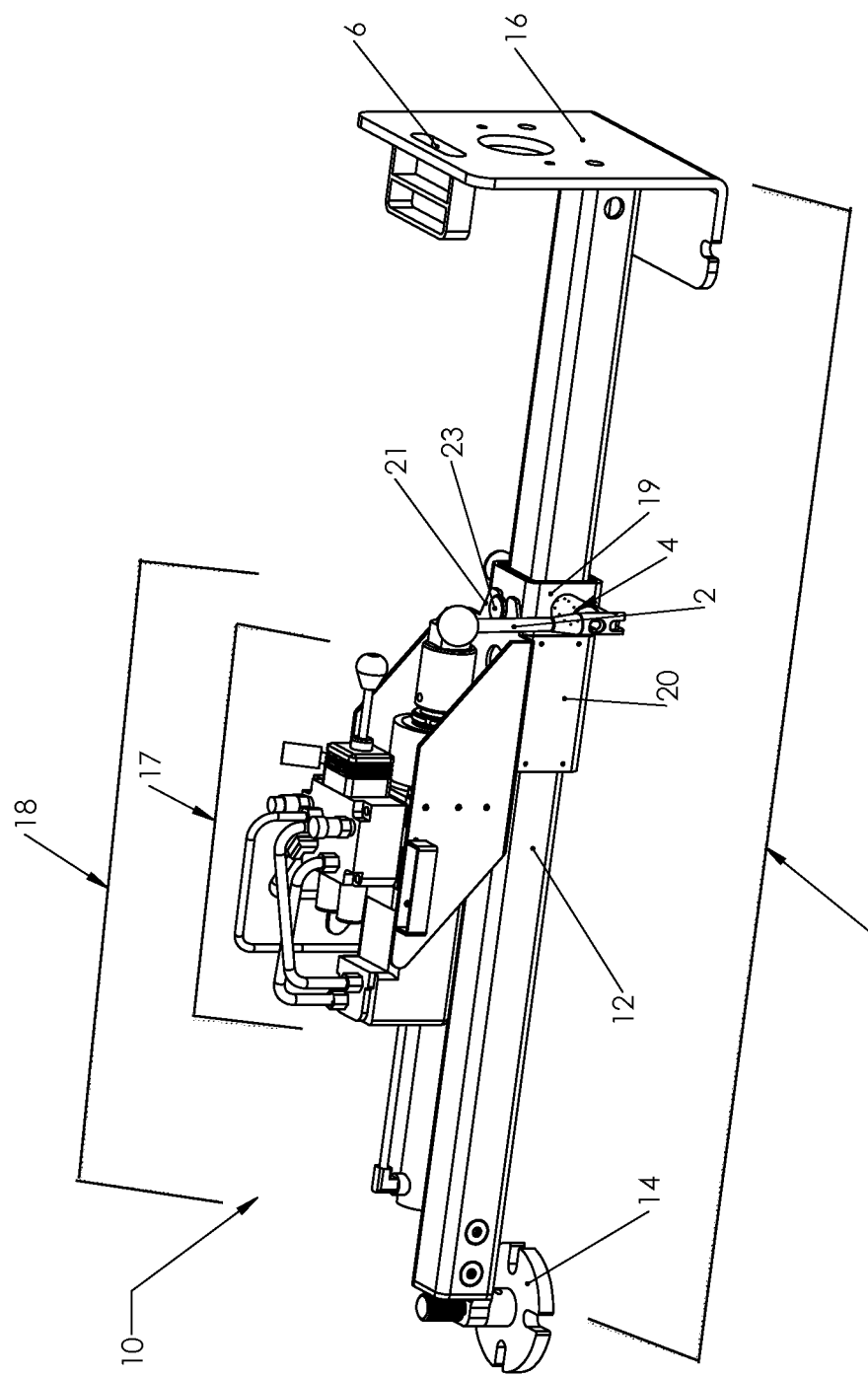
Figure 1C:
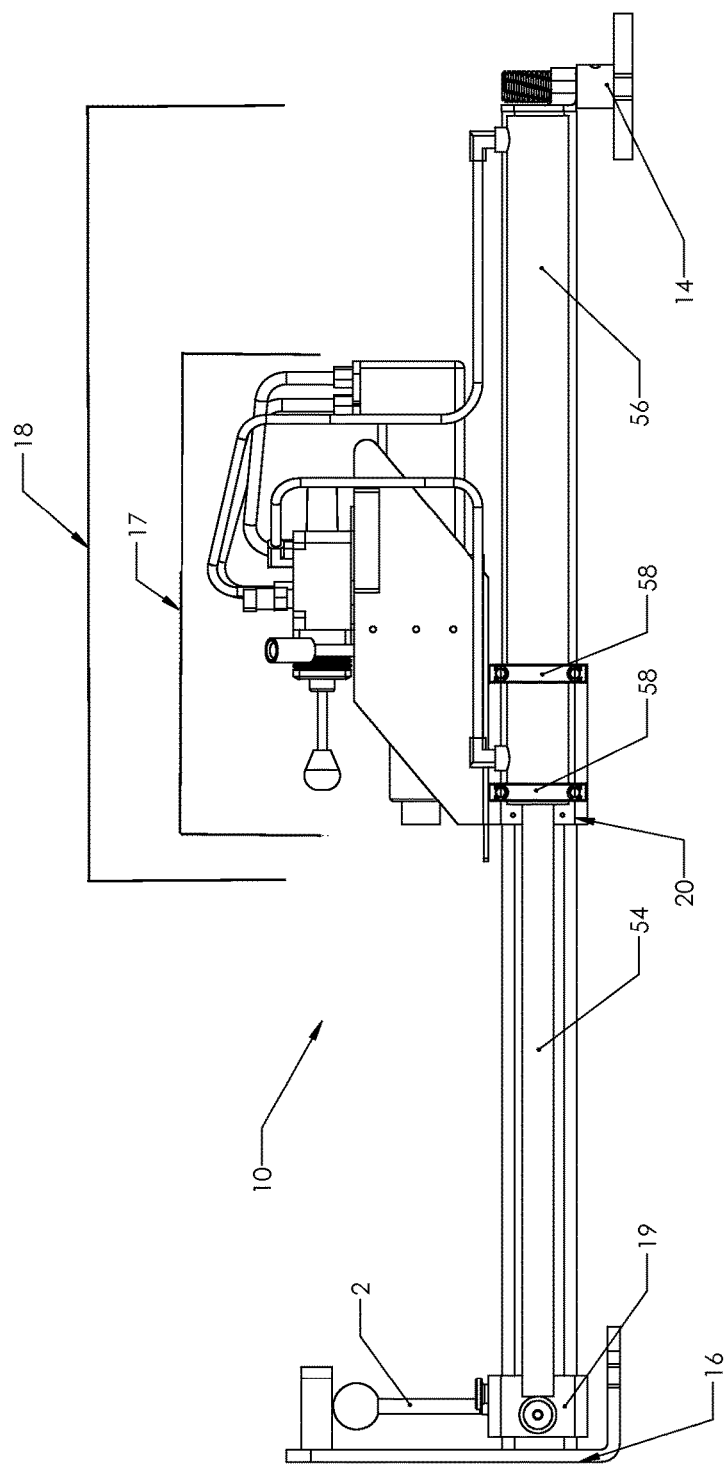
Figure 7:
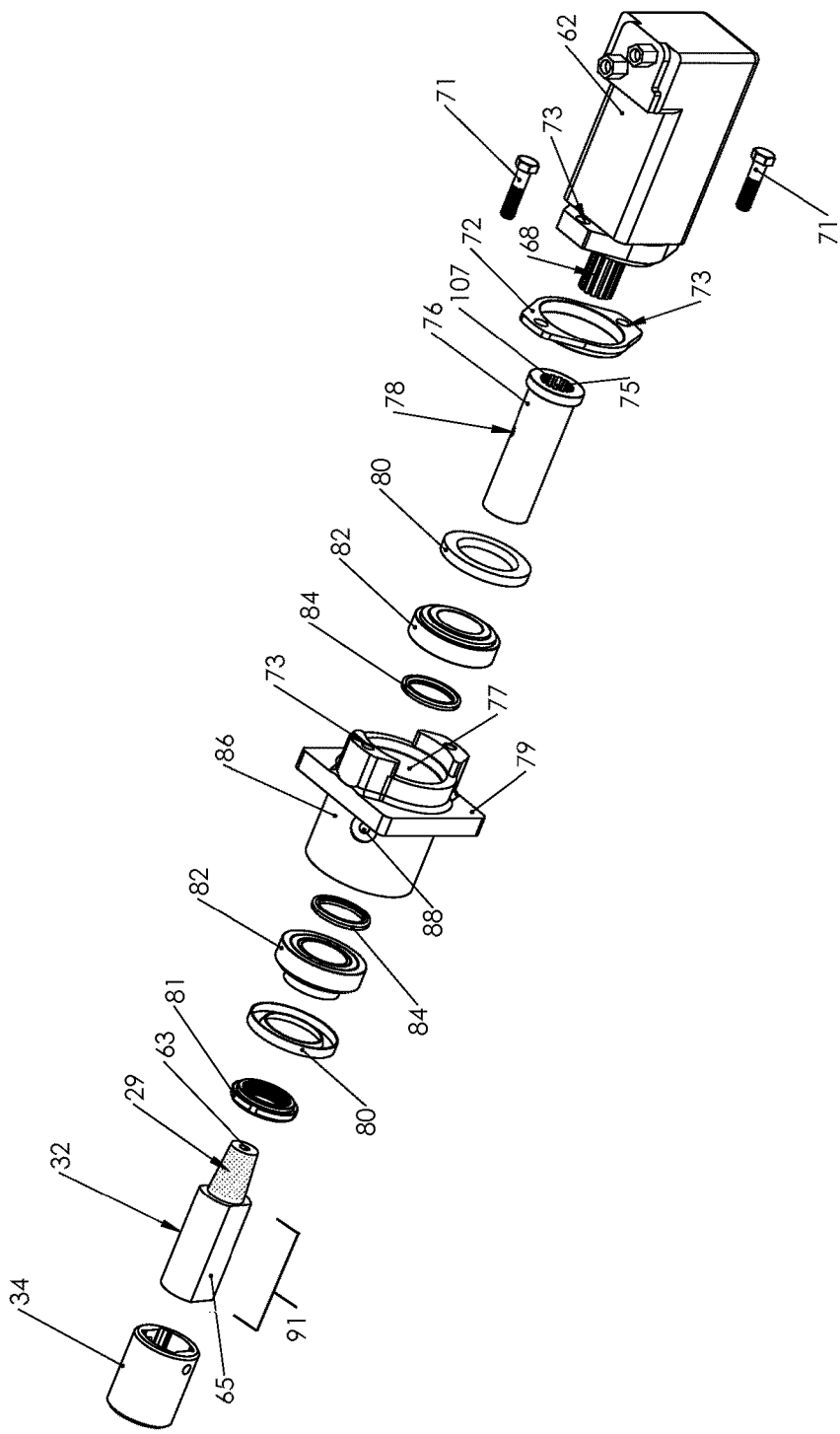
FIG. 7 is an exploded view of a rotary drive unit in accordance with one embodiment of this disclosure.
Figure 8:
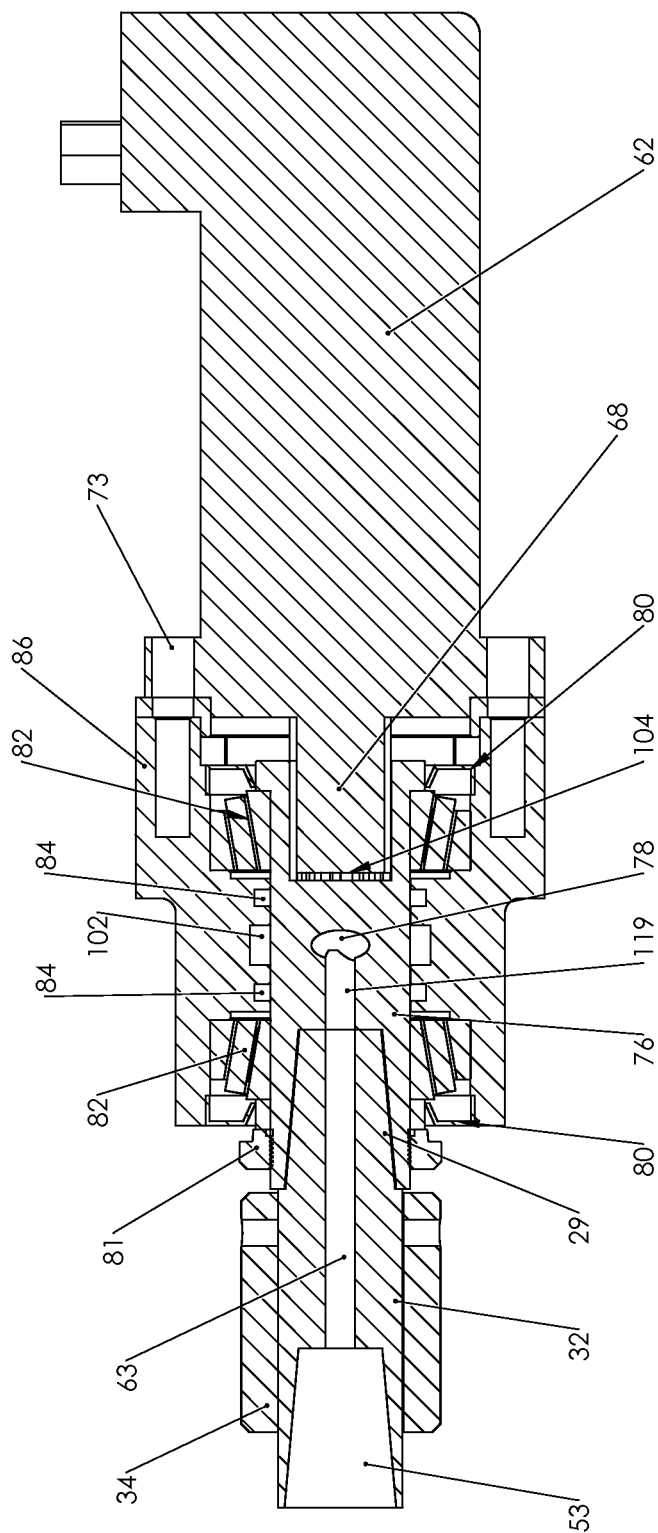
FIG. 8 is a cross-section of a water spindle unit in accordance with one embodiment of this disclosure.
Figure 9:
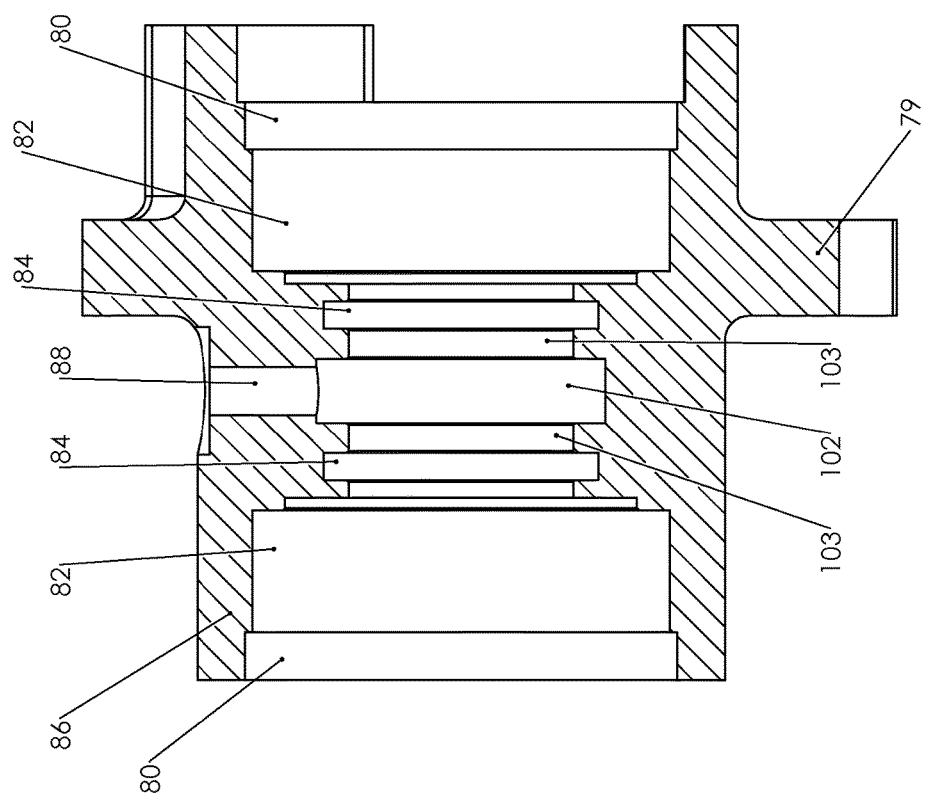
FIG. 9 is a cross-section of a water spindle unit housing in accordance with one embodiment of this disclosure.

Referring now to FIGS. 1A-1C, one embodiment of the hand-portable directional drilling device 10 in accordance with the present disclosure is shown. The device 10 comprises two detachable components. The first component, referred to herein as the chassis component 11, comprises a longitudinal frame or beam, referred to herein as chassis 12 having at its front or anterior end a plate 16 adapted for mounting on a wall, typically a concrete wall, and a removable adjustable foot plate 14 at its back or posterior end. In another embodiment, illustrated in FIG. 4B below, the foot plate 14 is replaced with a pit launch back plate 15 and the hand-portable directional drill disclosed here can be used for a pit-launch directional drilling application. The second component 18 comprises a combined power and rotary drive unit 17 for attaching stem pipe sections to form a drill string and drilling the string along an intended path underground. Typically, the combined power and rotary drive units 17 comprise a hydraulic valving system and hydraulic cylinder, and a hydraulic motor for driving a stem pipe spinning assembly, described in detail with reference to FIGS. 7-9, below.

Component 18 further comprises a slidable carriage 20 dimensioned to fit over chassis 12 and slide along its length under power of the power unit. Component 18 also further comprises a cuff 19, removably attached to carriage 20 by means of a fork collar 21 on carriage 20 and bolt 23 on cuff 19. Cuff 19 also is dimensioned to fit over chassis 12 and slide along its length. In the embodiment illustrated here, movement of cuff 19 along chassis 12 is manipulated by means of a lever 2 competent to extend and retract a pin 4. Pin 4 is dimensioned to fit in pinhole 13 (stage 1) and pinhole 27 (stage 2) on chassis 12. As described in more detail with reference to FIGS. 6A-6D below, when pin 4 is engaged with either pinhole 13 or pinhole 27, cuff 19 supports efficient staging of the directional drill of the present disclosure. Component 18 is referred to herein as "carriage component 18" and/or "combined power/drive component 18." Cuff 19 and carriage 20 have means for coupling together, when fork collar 21 on carriage 20 engages bolt 23 on cuff 19. Engaged cuff 19 and carriage 20 together are referred to herein as a "double collar". Accordingly, cuff 19 also is referred to herein as the "first collar portion" and carriage 20 also is referred to herein as the "second collar portion." FIG. 1C shows hand-portable directional drill 10 from the left perspective, illustrating position of hydraulic cylinder piston rod 54 and cylinder barrel 56 of carriage component 18 relative to chassis component 11. The front or anterior end of piston rod 54 attaches to cuff 19, and the barrel attaches to carriage 20. As illustrated in FIGS. 6A-6D, below, when cuff 19 is engaged with one of pinholes 13 or 27, carriage 20 can be moved forward to meet cuff 19, retracting piston rod 54 into barrel 56.

FIG. 2 is an exploded view of carriage component 18 but for the hydraulic cylinder, and illustrates one embodiment for arranging and attaching the member components described hereinbelow. In the example, carriage 20 is integrally attached to a frame 118 comprising a floor 22 and to which the rotary drive unit 24 is attached. Optionally, opposite opposing parallel side walls or braces 26 extend up from the edges of floor 22. The braces or side walls 26 can be of a solid material as illustrated here or define a structural frame of sufficient tensile strength to support carrying component 18, for example by means of handles 25, and to attach platform 28 and support hydraulic valving unit 30. In devices useful according to the present disclosure, means for securing rotary drive unit 24 in carriage component 18 are contemplated. In one embodiment illustrated here, rotary drive unit 24 comprises a frame component 79 that can slide into sleeves 109 extending vertically from floor 22 and attached to the inside of side braces 26. Other useful means for stabilizing rotary drive unit 24 to frame 118 include corner braces, crossbars spanning braces 26, or other means for anchoring and seating rotary drive unit 24. In addition, the vertical edges of side walls 26 may be angled or otherwise configured, contoured or cut to minimize weight and maximize ease of access to drill stem adapter 32 and wrench collar 34.

Once rotary drive unit 24 is seated in frame 26, platform 28 is attached to side braces 26, for example by means of bolts 110 in bolt holes 99, such that platform 28 sits above unit 24 and provides a floor on which hydraulic valving unit 30, can be placed. Those of ordinary skill in the art will appreciate that platform 28 may comprise a single piece of material, as illustrated here, or a structural frame or brace that lies parallel to, and spans the distance between, opposing side walls 26 and attaches to them by standard attachment means. Substantially stacking the slidable carriage 20, rotary drive unit 24, and hydraulic valving unit 30 supports reducing the overall dimensions of the hand-portable directional drilling device of the present disclosure. In the figure, cuff 19 is separated from carriage 20. When carriage component 18 is being transported, cuff 19 is attached to carriage 20 by tightening bolt 23 around fork collar 21.

Transporting the directional drill of the present disclosure to a launch site comprises the steps of providing or separating components 11 and 18 and carrying them individually to a desired location. As described above, carriage component 18 may include one or more handles 25 positioned for ease of access and carrying component 18 without interfering in the operation of the drill. Similarly, wall mount plate 16 may include a handle 6 for ease of carrying chassis component 11. Those having ordinary skill in the art will appreciate that the hand-portable directional drill of the present disclosure can be made out of a range of materials that will provide the requisite tensile strength for proper function of the device. It will also be appreciated that compacting the overall length and height of each component is preferred, as is choosing materials that reduce the overall weight of each component to be carried. High strength aluminum is a useful material for use where appropriate due to its light weight. Useful chassis components 11 have an overall length preferably less than 65 inches, more preferably less than 60 inches. Useful chassis materials include 10/18 steel, such as are used in 3" tubing. Wall mount plate 16, which preferably comprises an integral part of chassis 12, can vary in size and material, provided it can accommodate operational forces typical of directional drills of the size disclosed herein. Such forces typically are in the range of about two tons. Useful materials include a mild steel, including 10/18 mild steel, or A36 steel. Useful plate dimensions have lengths and widths in the range of about 10-14 inches, and have a thickness in the range of about 0.25-1.0 inches. Provided with the present disclosure it is within the skill of the art to fabricate a chassis component 11 that weighs less than about 100 pounds. Useful chassis components 11 can be less than 90 pounds, and are dimensioned to allow maneuverability when being carried around corners and up and down interior stairs or stairwells.

Similarly, the overall length of power/drive unit 18, together with its hydraulic cylinder generally is less than about 36 inches. Useful hydraulic cylinders include 32-inch cylinders with a 24-inch piston rod or stroke. Useful units have an overall height of less than about 18 inches and a width of less than about 12 inches. Provided with the present disclosure it is within the skill of the art to fabricate a power/drive unit 18 that weighs less than about 120 pounds. Useful units 18 can weigh less than 100 pounds, and can be dimensioned to allow ease of maneuverability when being carried around corners and up and down interior stairs or stairwells.

Provided with the disclosure herein, it now is possible to fabricate a hand-portable directional drill having an overall weight of less than about 200 pounds and competent to deliver drill strings over a range of at least about 200 feet underground. Useful hand-portable directional drilling devices according to the present disclosure can have an overall weight of less than about 190 pounds, and even can have an overall weight of less than about 185 pounds.

Once components 11 and 18 have been carried to the drill launch site, power/drive component 18 is coupled to chassis component 11 by sliding carriage 20 and attached cuff 19 over the back end of chassis 12, having first removed foot plate 14 from chassis 12 if it is attached.

Figure 3:
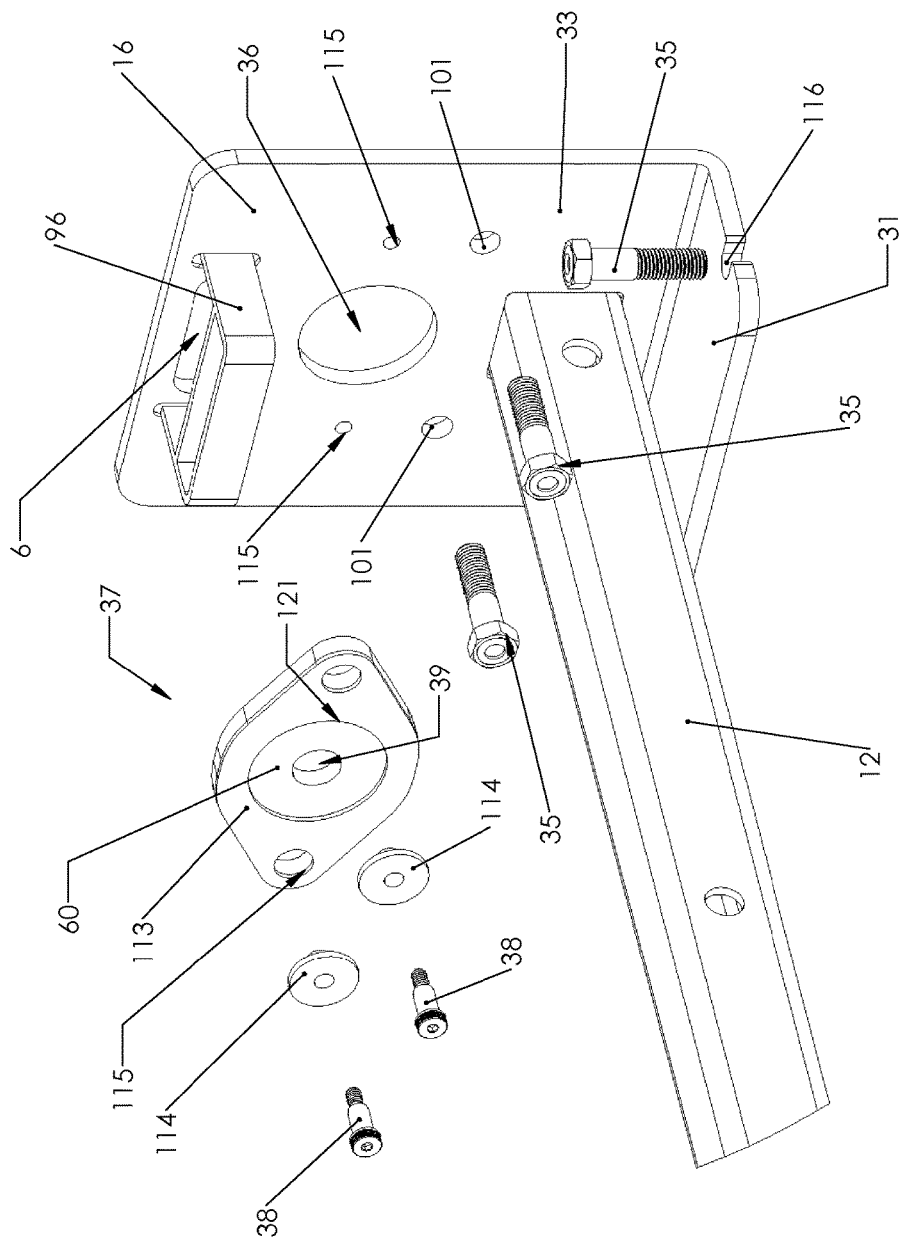
FIG. 3 is an exploded view of a wall mount plate in accordance with one embodiment of the present disclosure.

Turning now to FIG. 3, an exploded view of a wall mount plate useful in a hand-portable directional drilling device of the present disclosure is illustrated. In the figure, the wall mount plate 16 comprises a floor plate 31 and, perpendicular to, and joined to floor plate 31, a vertical wall plate 33. Plates 31 and 33 together define a 90° angle that can be placed flush against the intersection of a building's interior underground wall and floor, such as a basement wall and floor. As indicated above, the wall mount dimensions may vary provided the wall mount can support forces in the range of at least about two tons. Floor plate 31 provides stability for the drill during operation and may be optional. Floor plate 31 further may include one or more notches 116 on its perimeter to attach the plate surface to the building floor, for example by means of concrete bolts 35. Vertical plate 33 also preferably is attached to the wall by suitable bolting means, such as by bolts 35, typically concrete bolts, such as 0.75-inch redhead concrete bolts, in bolt holes 101. Drill bit hole or aperture 36 is dimensioned to allow both a drill bit head and a drill stem section to pass through it. Useful drill bit apertures diameters are in the range of about 3.0-4.0 inches, typically in the range of about 3.5 inches. As will be appreciated by those having ordinary skill in the art, useful aperture dimensions will depend on the size bore hole desired. When wall mount 16 is attached to the wall, chassis component 11 effectively can function as a cantilever, supporting carriage component 18, and can itself be supported by means of a foot plate, described in FIG. 4A below.

A flexible wiper assembly 37 also can be attached to the wall mount, typically by means of bolts 38. Typically, flexible wiper assembly 37 is attached to wall mount 16 once a drill string has been drilled to its destination and the drill string is about to be retrieved. The wiper typically comprises a metal frame or plate 113 having a central aperture 121 in front of a flexibly stiff material 60, composed of, for example, rubber or silicon. Material 60 has an opening 39 with a diameter smaller than drill bit hole 36 and wiper frame aperture 121. Opening 39 also is dimensioned to be smaller than the outer diameter of a stem pipe such that it provides a snug fit over the pipe surface. Wiper assembly 37 is attached to wall mount 16, for example, by drilling bolts 38 through washers 114, and bolt holes 115 in wiper frame 113, wiper material 60 and wall mount 16. Optional washers 114 allow material 60 mobility behind stabilizing plate or frame 113. When a drill string is being retrieved wiper material 60 serves to wipe off mud and/or water from the stem pipe surface as the string is being pulled through aperture 39, substantially preventing these materials from accumulating in the room or on the drilling device.

Figure 4:
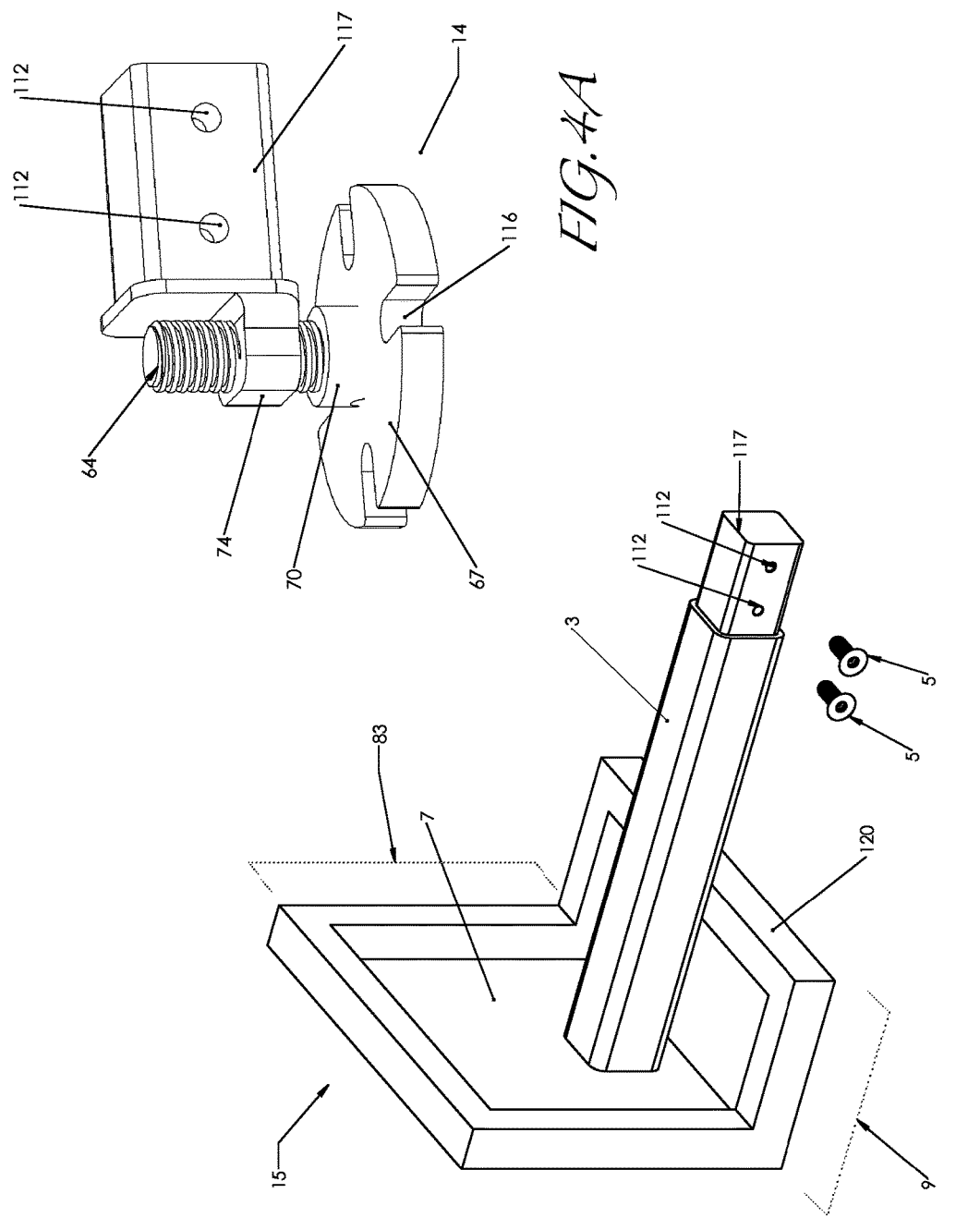
FIGS. 4A and 4B illustrate two embodiments of a hand-portable directional drill in accordance with this disclosure for use in (4A) an interior space, and (4B) a pit-launch application.

FIGS. 4A and 4B illustrate two embodiments of a hand-portable directional drilling device of the present disclosure. The figures provide an expanded view of the back or posterior end of chassis component 10. FIG. 4A illustrates an embodiment useful for drilling from within a building interior and illustrates a floor plate removably attached to the back end of chassis 12. Floor plate 14 comprises a flat plate 67, a collar 70 extending vertically from plate 68 and located substantially in the center of plate 68, and a threaded pin or bolt 72 extending vertically from collar 70. Pin 72 threads into bolt 74, integral to and extending back from chassis extension sleeve 117. Extension sleeve 117 has an outer diameter that is smaller than the inner diameter of chassis 12, such that sleeve 117 can slide into the back end of chassis 12 and be bolted thereto by, for example, supplying bolts to bolt holes 112. Floor plate 14 serves to brace and stabilize the back end of chassis 12 and optionally can include one or more notches 116 in the perimeter of plate 67 through which concrete bolts can be drilled to further anchor floor and stabilize floor plate 14. The threaded nut and bolt allows floor plate 14 to raise and lower the height of the chassis 12 as desired so that directional drill 10 can be made level for efficient drilling. The floor plate assembly disclosed herein is one means for allowing floor plate 14 to be removed easily from chassis 12 for assembly and disassembly of chassis component 11 and combined power/drive component 18. Other means are within the skill of the art to fabricate in view of the present disclosure.

FIG. 4B illustrates an embodiment useful for drilling from an exterior pit. Here the back end of chassis 12 is removably attached to an extension sleeve 117 by means of bolts 5 in bolt holes 112 as described above for floor plate 14 in FIG. 4A. Extending back from sleeve 117 is a chassis extension 3, whose distal end is integrally attached to a pit wall brace 15 by attaching to a metal plate 7. Brace 15 comprises a floor section 9 and, perpendicular thereto and extending up therefrom, a wall portion 83. Where the directional drilling device of the present disclosure is used for a pit launch application the back pit wall brace 15 is subject to significant repetitive force in the drilling process and preferably is constructed to accommodate these forces. The brace in FIG. 4B does so by comprising an outer frame 120 that helps absorb the drilling forces, and to which metal plate 7 is integrally attached. Other means are within the skill of the art to fabricate in view of the present disclosure. Also as will be appreciated by those having ordinary skill in the art, extension 3 can be either of a predetermined length or configured to be extensible from chassis 12.

Figure 5:
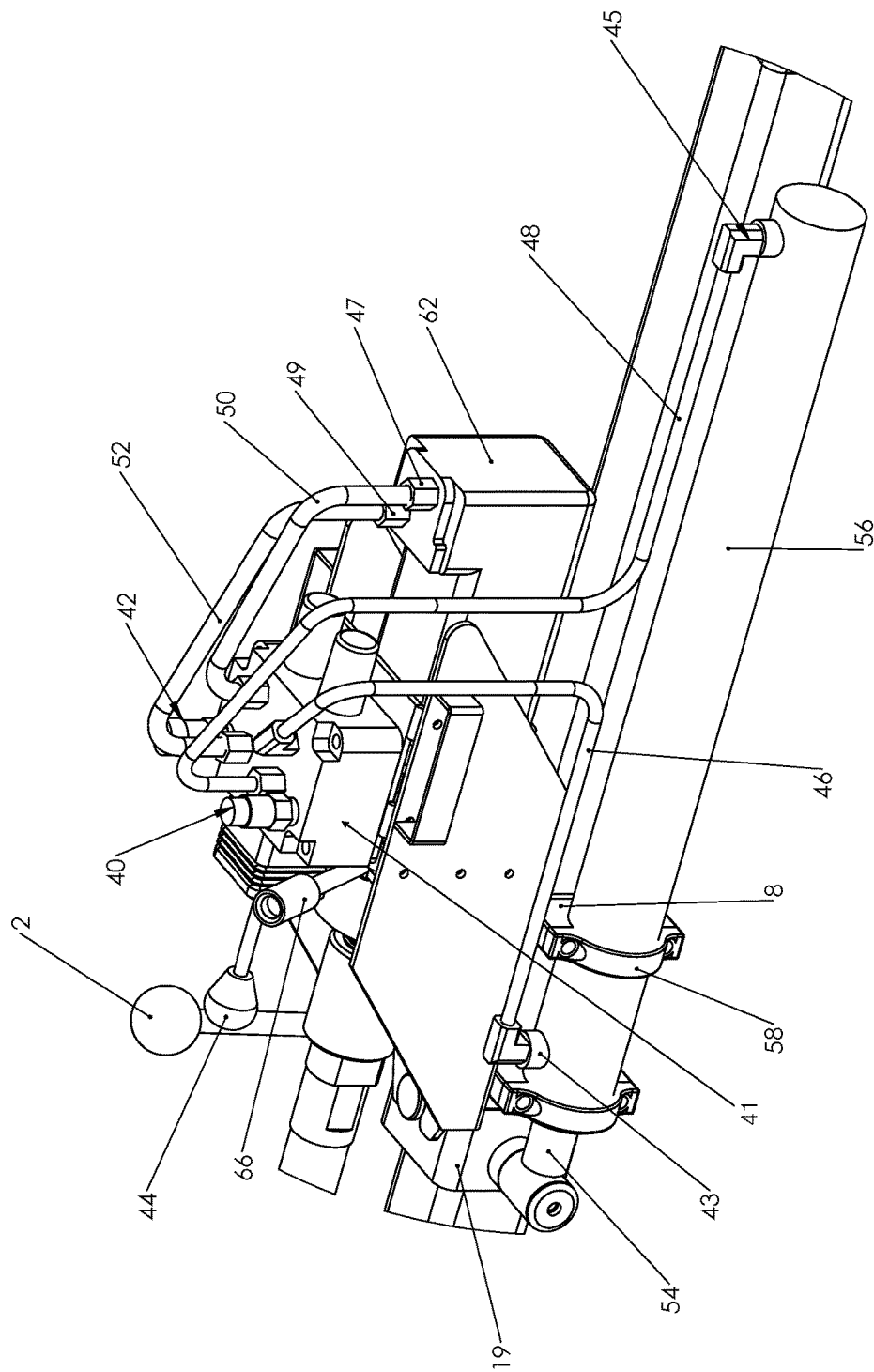
FIG. 5 illustrates a hydraulic valving system of a hand-portable directional drill device in accordance with one embodiment of this disclosure.

FIG. 5 illustrates a power unit in an embodiment of the hand-portable directional drilling device of the present disclosure. The power unit comprises a standard hydraulic quick disconnect 4-position valving unit such as are well characterized in the art. The unit comprises a male hydraulic in port 40, a female hydraulic out port 42, a valving compartment 41, a multi-positional lever or joystick 44, and at least four hydraulic valve lines transferring fluid as directed to drive activity. The power unit further comprises a hydraulic cylinder comprising a piston rod or stroke 54 within a housing or barrel 56, secured to carriage 20 by, for example, brackets 8 and/or cuffs 58. The front end of hydraulic piston rod 54 is attached to moveable cuff 19. When hydraulic valve line 46 transfers fluid to a port 43 at the front end of hydraulic cylinder barrel 56 on direction from positional lever 44, carriage 20 and attached combined power/drive unit 17 move forward along chassis 12. When hydraulic valve line 48 transfers fluid to a port 45 on the back of barrel 56, carriage 20 and attached combined power/drive unit 17 move back along chassis 12. When hydraulic valve line 50 transfers fluid to a port 47 on hydraulic motor 62, the drill stem rotary unit rotates in the clockwise position (this and all directional views are from the perspective looking forward from the back of the drilling device). When hydraulic valve line 52 transfers fluid to a port 49 on hydraulic motor 62, the drill stem rotary unit rotates in the counter-clockwise position. Useful hydraulic motors having application in hand-portable directional drilling devices disclosed herein can be high-torque, low-speed motors, with operational rpm's in the range of at least about 200-600 rpm's, and hydraulic fluid gpm's in the range of at least about 10-25 gpm's.

Turning now to FIG. 6A-6D, the staging mechanism for a hand-portable directional drilling device of the present disclosure is described. The directional drilling device of the present disclosure makes use of a two-part staging system in order to maximize the length of drill stem sections utilized to create a drill string, while minimizing the overall length of the directional drill device itself. Hydraulic cylinders useful in the multi-staging directional drilling device of the present disclosure have lengths in the range of about 32 inches.

Figure 6A:
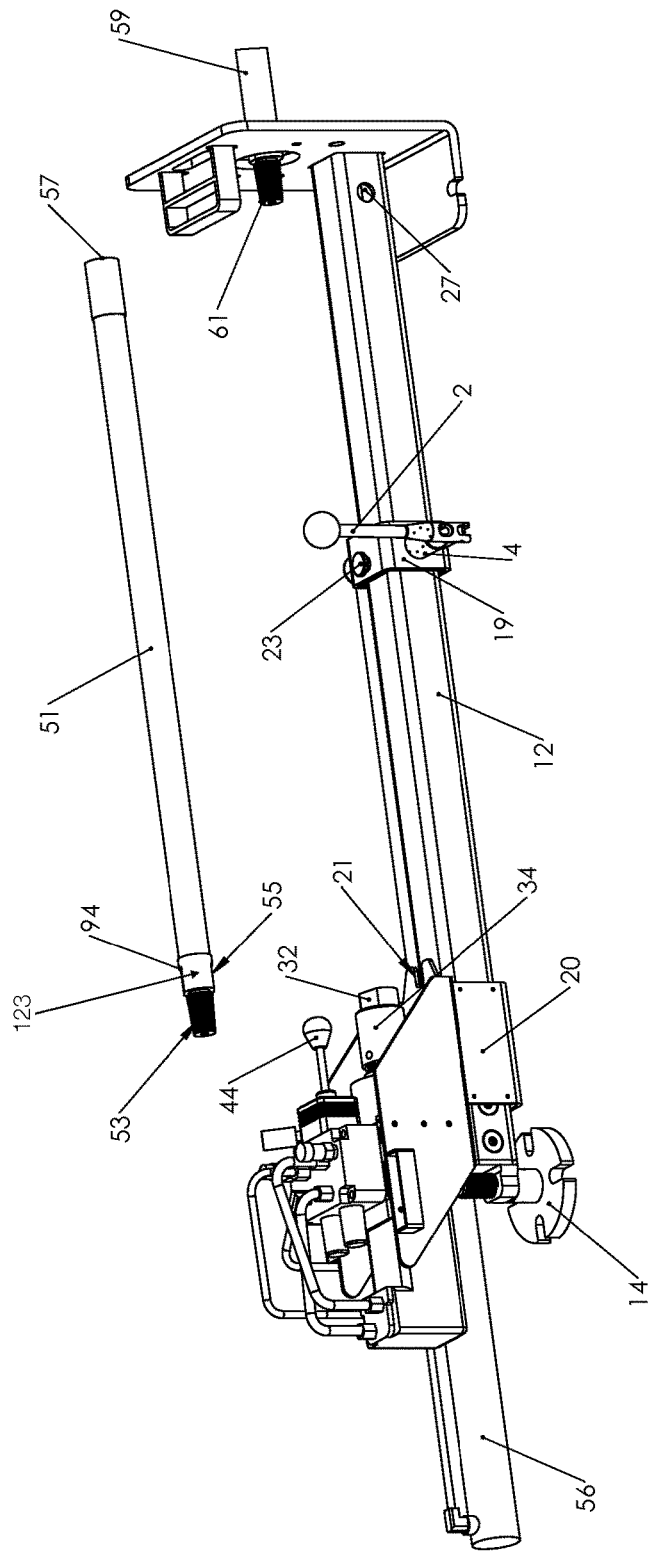
FIGS. 6A-6D illustrate four separate staging positions of a hand-portable directional drill device in accordance with one embodiment of the present disclosure.

Using FIG. 5 for reference, the process begins in the full back reset "stage 0" position illustrated in FIG. 6A, with carriage 20 and attached combined power/drive unit 17 in the full retracted position, achieved by maneuvering multi-positional lever 44 to deliver hydraulic fluid to valve line 48. Cuff 19 is in the stage 1 position with pin 4 engaged with pin hole 13. In the fully retracted "reset" position, hydraulic piston rod 54, attached to cuff 19, is fully extended and, on demand, carriage 20 and the attached power/drive unit can be powered forward along the chassis length 12.

FIG. 6A illustrates a drill stem section 51 about to be added to an existing drill string. The drill stem section provided in the present embodiment is illustrative of standard pin and box drill stems well known and characterized in the art. Drill stem 51 comprises a tube having a central channel for optionally delivering lubricant to a drill head, a tapered threaded "pin" end 53 at the back end of the stem and an internally threaded "box" 57 at the front end of stem 51. The internal threads of box end 57 are configured to receive and engage a tapered threaded pin end 53 from another drill stem 51, thereby forming a plurality of drill stems longitudinally engaged end-to-end to form a hollow drill string. Drill stem 51 further comprises one or more breakout wrench receiving flats or depressions 55 on its outer surface substantially proximal to and forward of tapered threaded pin end 53. The flats or depressions can serve as externally accessed torque transfer means or as wrench receiving surfaces. Drill stems of particular utility in the devices of the present disclosure comprise at least two flats 55 diametrically opposed from one another about the outer surface of drill stem 51 and substantially at the same distance from the distal end of pin end 53.

In FIG. 6A an existing drill string 59 is illustrated, the back end of which, pin end 61, extends through drill bit hole 36. Drill stem 51 is added to the drill string by, for example, manually threading box 57 of stem 51 onto pin end 61 of drill string 59. Then multi-positional lever 44 is maneuvered to deliver hydraulic fluid through line 46 to move carriage 20 forward. As stem adapter 32, which has internal threads dimensioned to receive and engage a tapered threaded pin end 53, approaches pin end 53 of stem 51, multi-positional lever 44 is maneuvered to deliver hydraulic fluid to valve line 52 so that adapter 32 rotates clockwise to engage pin end 53 and form an adapter/stem pipe joint 93.

Figure 6B:
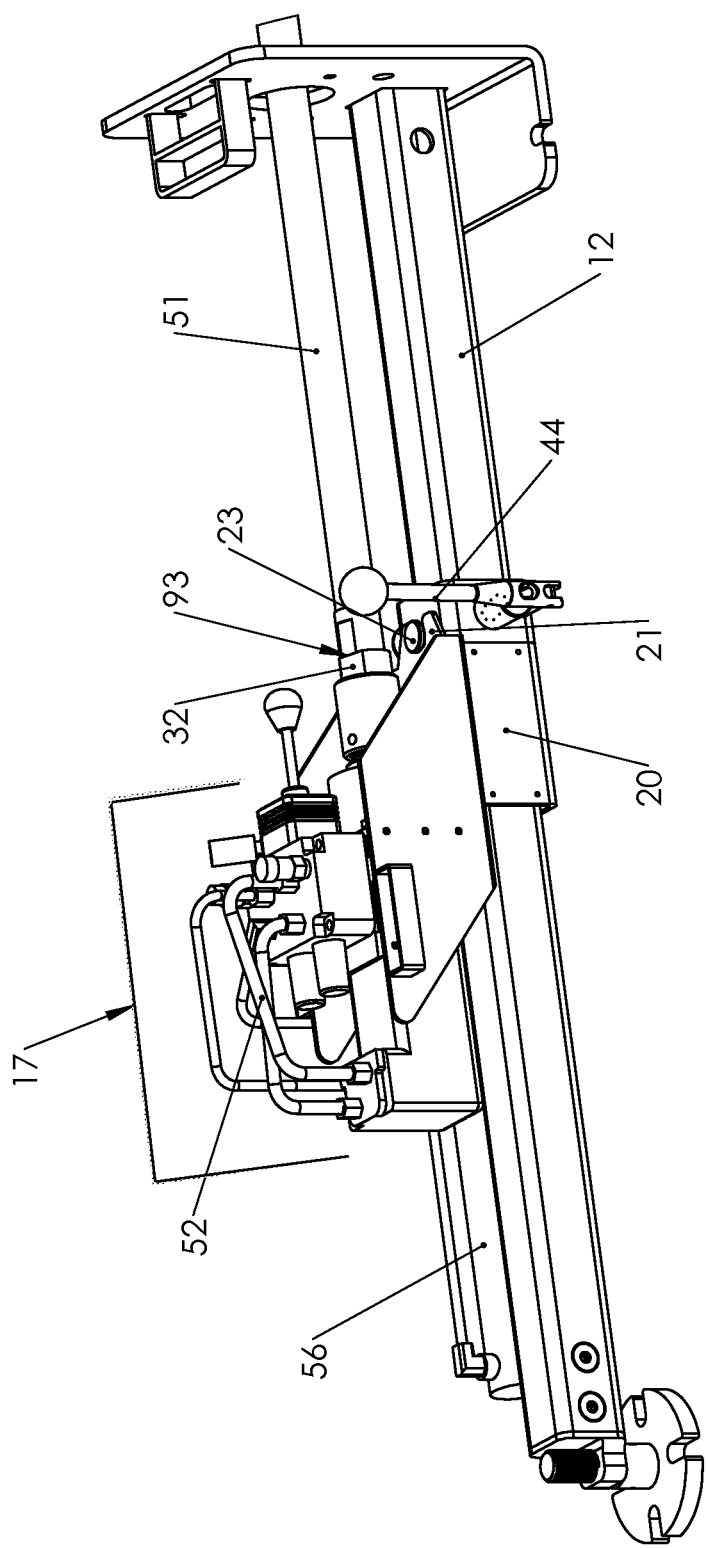

Forward movement of carriage 20 and attached combined power/drive unit 17 collapses hydraulic piston rod 54 into barrel 56 such that when fork collar 21 on carriage 20 engages bolt 23 on cuff 19, hydraulic piston rod 54 is maximally collapsed and stage 1 is complete. This position is illustrated in FIG. 6B.

Figure 6C:
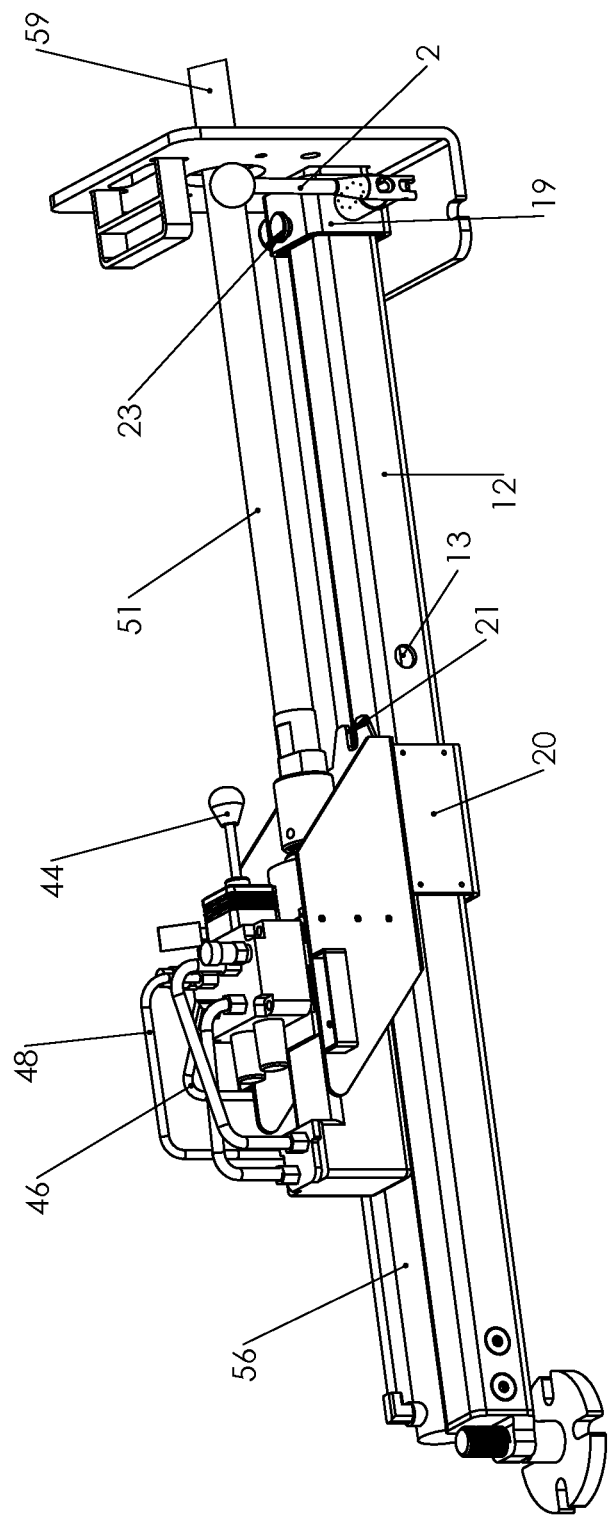
Figure 6D:
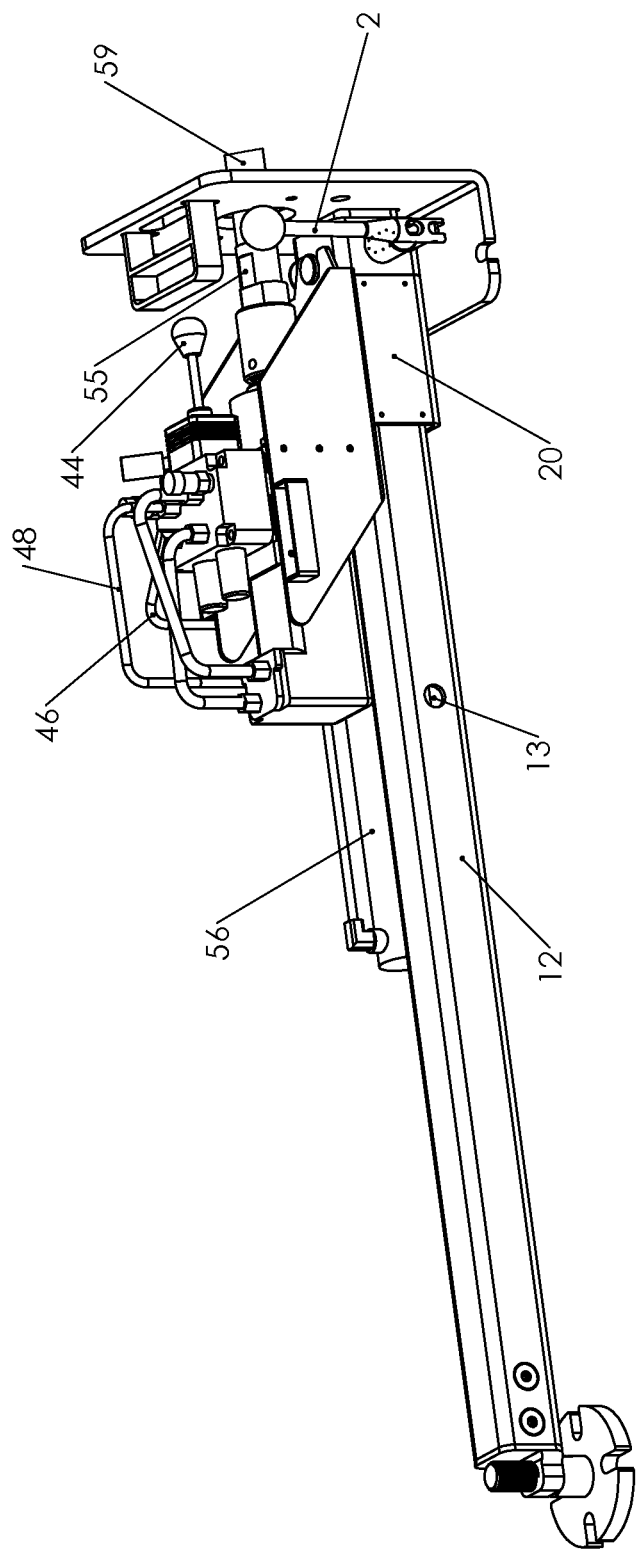

Moving now to FIG. 6C, lever 2 is pulled to disengage pin 2 from chassis 12, and cuff 19 is free to slide forward along chassis 12 until pin 2 engages pin hole 27 (stage 2). Forward movement of cuff 19 to stage 2 pin hole 27 extends hydraulic piston rod 54 out of barrel 56 allowing carriage 20 and the attached power/drive unit to move forward again on demand. Multi-positional lever 44 again is maneuvered to deliver hydraulic fluid through line 46 to move carriage 20 forward, driving drill stem 59 along its intended underground path. As illustrated in FIG. 6D, when fork collar 21 again engages bolt 23, preventing additional forward movement, hydraulic rod 54 has been collapsed back into barrel 56 and stage 2 is complete. In this position adapter/stem pipe joint 93 is proximal to wall mount 16, and drill stem 51 is ready to be disengaged from drill adapter 32. An example for facilitating cracking or breaking the adapter/drill stem joint 93 in accordance with an embodiment of the present disclosure is described with respect to FIGS. 11A-11C below. Once joint 93 is broken, multi-positional lever 44 then is maneuvered to deliver hydraulic fluid to valve line 52, rotating adapter counter-clockwise to completely disengage adapter 32 from pin end 53.

Carriage component 18 then is restaged to its start position for receiving a new stem pipe 51 to be added to drill string 59 by pulling lever 2 to disengage cuff 19 from its stage 2 position and sliding carriage component 18 back along chassis 12 until pin 4 in cuff 19 engages stage 1 pin hole 13. Multi-positional lever 44 then is maneuvered to deliver hydraulic fluid to valve line 48, moving carriage 20 back to the fully retracted "reset" position (stage 0) illustrated in FIG. 6A, and extending hydraulic piston rod 54 out from barrel 56.

As will be appreciated by those having ordinary skill in the art, drill stem pipe dimensions can vary for different desired applications. Generally useful drill stem pipes comprise 41/40 steel. Drill stem pipes that accommodate the dimensions of the hand-portable drilling device disclosed herein and optimize the staging process disclosed herein have an overall length in the range of at least about 30-40 inches, including 1-meter length pipes, have an outer diameter in the range of about 1.5-2.0 inches, and have an inner diameter in the range of about 0.25-0.625 inches. Smaller stem pipes bore or inner channels, for example, having diameters in the in the range of about 0.3-0.4-inches, have the advantage of reducing the amount of lubricant that traverses through the drill string and may need to be captured during drilling and/or retrieval of the drill string. As will be appreciated by those having ordinary skill in the art, useful bore diameters include those that deliver lubricant to a drill tip in the range of at least about 5 gpm's for a 200 ft drill string and also accommodate in the range of at least about 10 gpm's for 70 ft drill strings. Useful pipe stems also comprise wrench flats as described herein having substantially standard dimensions well used and characterized in the art, typically having substantially similar widths and lengths, and generally in the range of about 0.7-1.0 inches.

Figure 12:
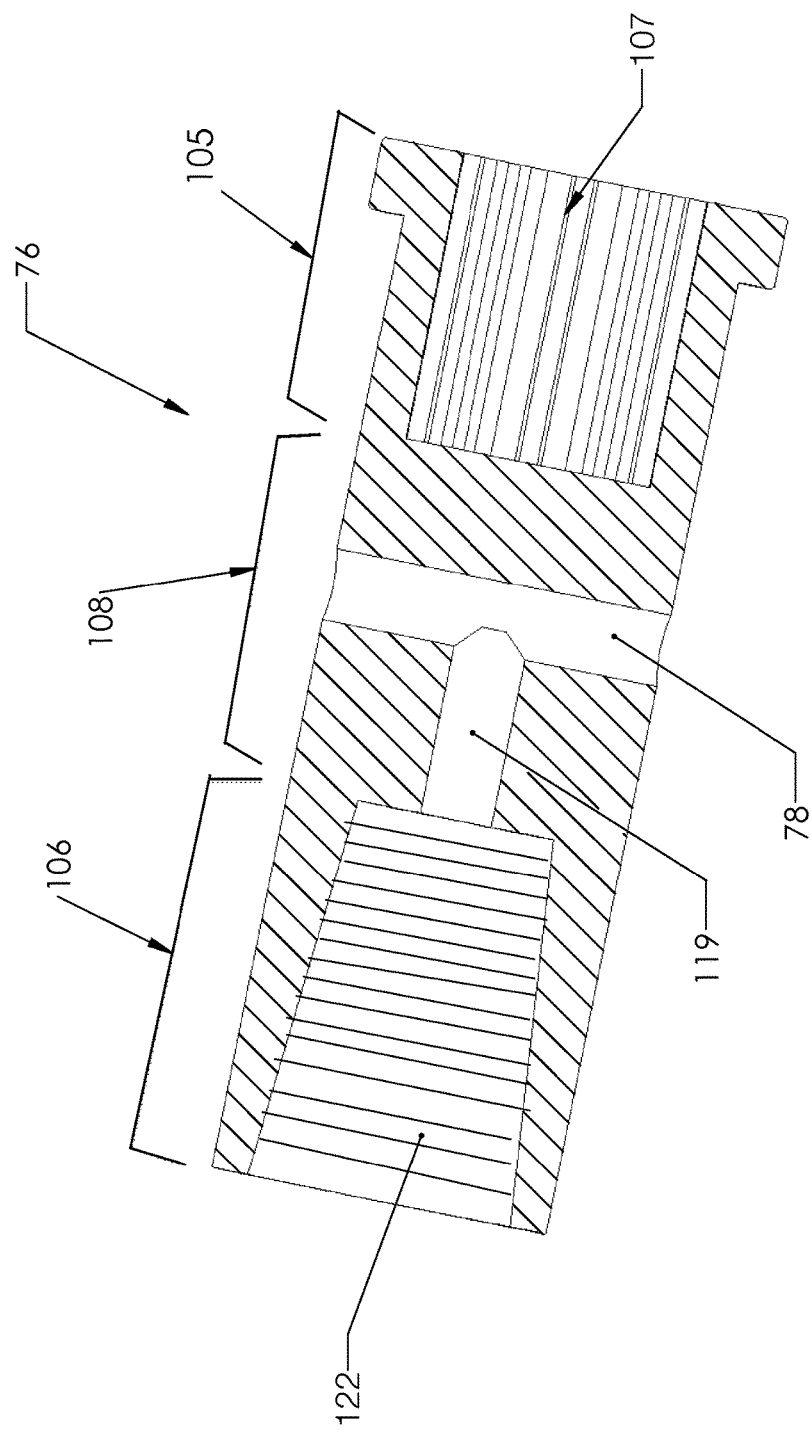
FIG. 12 is a cross-section of a spindle in accordance with one embodiment of the present disclosure.

FIGS. 7-9 and 12 illustrate a rotary drive unit and components thereof in accordance with one embodiment of the present disclosure. The rotary drive unit differs from similar units in the art at least in that hydraulic motor 62 attaches directly to rotary drive housing 86 by means of motor adapter 72, and main shaft or spindle 76 is dimensioned to fit inside housing 86 without extending substantially herefrom. In particular, spline engagement of shaft 76 with splines 68 of motor 62 occurs within water housing 86. Shaft or spindle 76 comprises internal splines 107 at its back end, dimensioned to engage splines 68 extending forward from hydraulic motor 62. Engaged splines 104 are shown in cross-section in FIG. 8. In rotary drives of the art, water housing 86 typically is attached to motor 62 by means of an external plate/spline assembly and can be placed separate from the spindle bearing assembly, extending the length of the drive unit by multiple inches, and adding weight to the device. As illustrated in FIG. 12, shaft 76 comprises a cylinder having an opening 75 extending part way in to the interior of the cylinder from both ends of the cylinder and comprising substantially three separate internal sections along its central longitudinal axis. A first section 105 at the back end of shaft 76 has an inner surface 107 defining splines that engage splines 68 on hydraulic motor 62. A central section 108 serves as a lubricant cavity, isolated from spline section 105. Central section 108 includes two port openings 78, diametrically opposed from one another about the circumference of spindle 76, and that receive lubricant from housing 86 lubricant cavity 102. Central section 108 further includes an opening 119 dimensioned to deliver lubricant into a third section 106 at the front end of shaft 76. More particularly, opening 119 is dimensioned to deliver lubricant to the hollow bore 63 of a pipe stem adapter 32. Accordingly, front section 106 has an inner surface 122 comprising internal threads dimensioned to receive and engage a hollow threaded tapered "pin" end 29 of drill stem adapter 32. Bolts 71 attach hydraulic motor 68, adapter 72, and housing 86 by means of bolt holes 73.

Housing 86 defines a hollow sleeve 77 having an internal diameter 103 dimensioned to allow shaft 76 to pass through it. Reasonable clearance distances between the shaft 76's outer diameter and housing 86's inner diameter 103 may be in the range of at least about 0.001 inches. Housing 86 also comprises a central radial channel or cavity 102 that receives and holds drill head lubricant provided to the housing interior by means of port 88, and a plurality of grooves or radial channels that extend out from either side of cavity 102 to seat seals and bearings that support efficient drill stem rotation. Housings 86 useful in the hand-portable directional drilling devices of the present disclosure include at least six grooves or channels, or two sets of three matching and axially opposed grooves or channels that extend out from lubricant cavity 102, each groove set comprising, from the innermost position and extending out: a groove or channel dimensioned to receive and seat a water seal 84, followed by a groove or channel dimensioned to receive and seat a roller bearing, typically a tapered roller bearing 82, and a groove or channel dimensioned to receive and seat an oil or grease seal 80. Each of bearings 82 and seals 80 and seals 84 are of an annular shape having an inner diameter through which shaft 76 can pass. A bearing nut 81 attaches to the front end of housing 86, having an annular shape with an inner diameter through which spindle 76 can pass. As will be appreciated by those having ordinary skill in the art, the overall lengths of housing 86 and shaft 76, and the distances between bearing grooves and seal grooves are modifiable without negatively impacting operation of the device. Preferred useful dimensions that maximize function and compactness are well within the skill of the art to select.

Drill stem adapter 32 further comprises an internal bore or channel 63 that traverses the longitudinal axis of the adapter and through which fluid can flow through the drill string central bore or channel to the drill head during drilling. Housing 86 further includes a port 88 for providing a drill head lubricant to adapter 32 by means of opening 78 in shaft 76. In the present illustration port 88 occurs in the "11 o'clock" position on the housing circumference. It will be appreciated that, while the longitudinal axial position of the port along the housing surface is determined by the position of the internal channels or grooves, the circumferential position of the port on the housing may be varied as desired for ease of lubricant line access. Water is a useful lubricant well characterized in the art and has utility in devices of the current disclosure. Pressurized water lines attached to port 88 typically can include a gauge for measuring water pressure in the line.

Housing 86 as illustrated here further comprises a frame 79 dimensioned to provide means for seating and stabilizing rotary drive unit 24 in frame 118, for example, braced within sleeves 109 of frame 118, as illustrated in FIG. 1B.

Referring now to FIGS. 10A-10C one embodiment of a magnetized wrench collar useful in the devices of the present disclosure is illustrated. It will be appreciated by those having ordinary skill in the art that the fixable, positionable collar disclosed herein has application beyond the present devices and finds utility in any application where a readily accessible, easily engaged and removable anti-torquing means is desired. Particularly useful are any jointing applications comprising rod or tubular components and joints, where anti-rotational or anti-torquing action is desired and where regular repeated access to the joint is preferred. Useful joints include those in any drilling application and could include, without limitation, angled joints. Referencing FIG. 7, drill stem adapter 32 has opposing parallel flats 65 machined along the outside barrel length 91 of adapter 32 anterior to threaded pin end 29. Flat 65 has a dimensional width substantially matching flat 55 on a drill stem section 51. Collar 34 comprises a hollow sleeve or channel competent to slide over a drill stem section 51 or an adapter 32. In this embodiment, the inner sleeve or channel has a diameter sufficient to contact, receive and slide over adapter stem 32 and flat 55 of attached drill stem section 51. Forward movement of collar 34 along pipe stem 51 is prevented by a lip 94 at the anterior end of flat 55. Collar 34 further comprises at least one magnet 90, such as a rare earth magnet, embedded in a surface of the collar. Typically, magnetized wrench collars useful in the directional drilling devices disclosed herein comprise two magnets 90 diametrically opposed from one another about the circumference surface of collar 34. Magnet(s) 90 are of sufficient strength to magnetize collar 34 such that collar 34 removably engages with the metal surface of an object in contact with the collar's inner surface. In the illustration such objects include stem adapter barrel 91, stem pipe flat component 123, and an adapter/stem pipe joint 93. Magnetized collar 34 has an inner circumference contour dimensioned to mirror the outer circumference contour of adapter 32 and the stem flat component 123 of a stem pipe section 51. That is, the inner contour of collar 34 comprises opposing parallel flats 92 machined along its internal longitudinal axis, the flats 92 having substantially the same dimensional width as flats 55 and 65. When not in use, collar 34 sits on adapter 32's barrel section 91, back away from joint 93 in a "resting" position, with magnet(s) 90 keeping collar 34 in position. In operation, a pipe section 51 is threaded into adapter 32 such that flats 65 and 55 are aligned. Collar 34 can be slid over adapter/stem joint 93 until forward movement is stopped by lip 94. Magnet(s) 90 hold collar 34 in place over the joint, and the collar's inner circumference contours holds joint members stable relative to one another, preventing undesired unthreading when pipe sections are being cracked open during pipe string retrieval, as is described in Example 3 below. While collar 34 also may be used to prevent over-torquing or over-rotation, for example while attaching pipe section 51 to the drill string or during drilling of the string, drill stem joints having utility in the present disclosure typically use tapered threads designed and fabricated to prevent over-torquing when engaged, and so use of collar 34 is not required during forward drilling operation. Contact surfaces of collar 34, adapter 32 and/or pipe stem flat 55 may be lubricated to reduce friction and facilitate collar movement on and off joint 93. The outer surface of collar 34 further may be textured as by hatch marks or grooves, for example, for enhanced gripping during operation.

It is within the skill of the art to vary the number, location, size and strength of magnets on a surface of a wrench collar of the present disclosure. It also is within the skill of the art to modify the contours of the collar's inner dimensions to mirror other useful joint member outer contours or for other applications. Key features of the magnetized collar of the present disclosure are its ability to removably or temporarily stay attached to any location where it is placed, while also easily being disengaged from that position and moved to another position (e.g., resting or operational) as desired, particularly where the resting and operational locations are contiguous and substantially adjacent or proximal to one another. Preferred magnet strengths will depend on metal thickness, collar size, and operational conditions such as vibration and torque, all of which are within the skill of the art to determine.

Figure 11A:
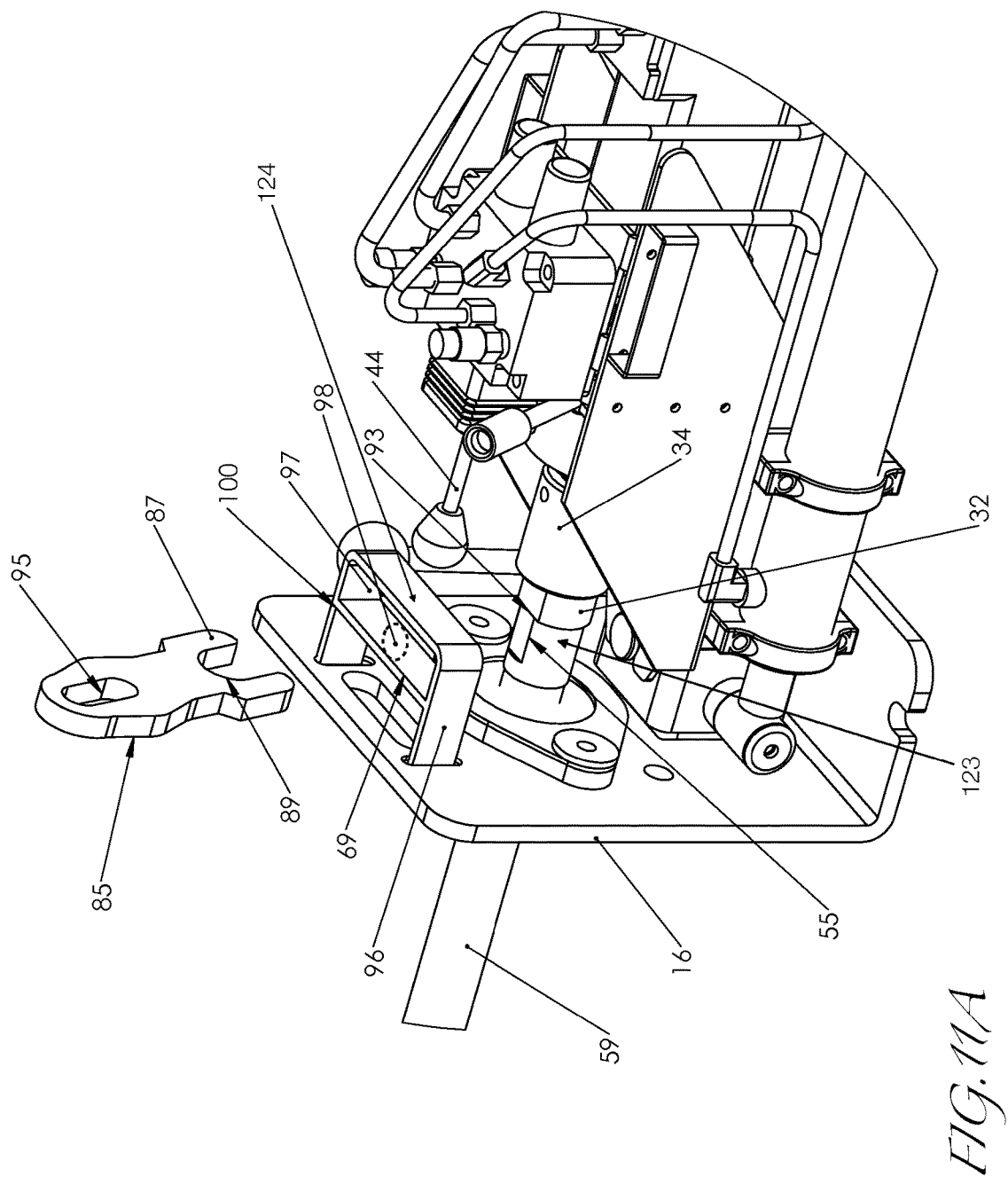
Figure 11B:
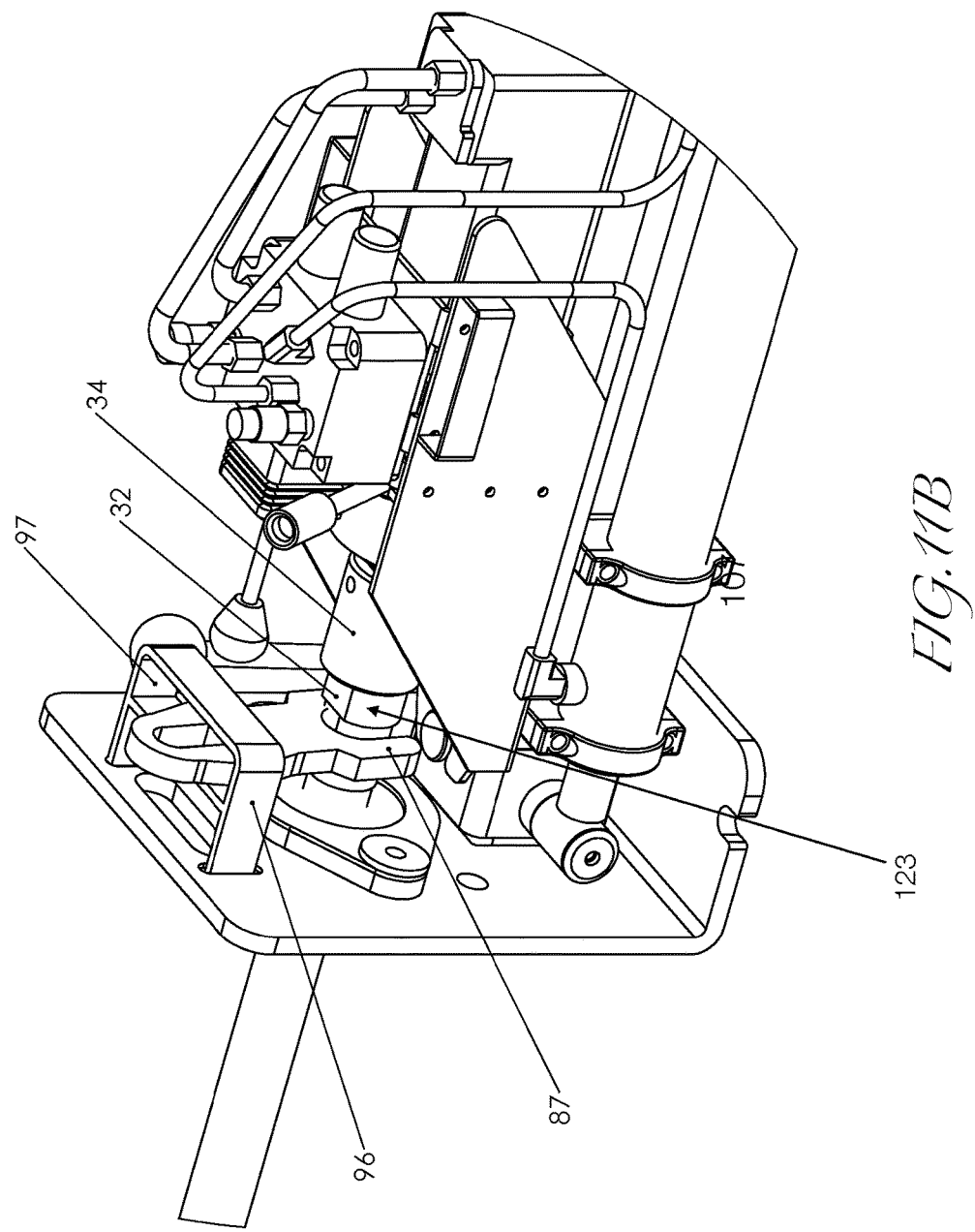

FIGS. 11A-11C illustrate one embodiment of a device and breakout technique for breaking or cracking open pipe section joints created using devices of the present disclosure. It will appreciated by those having ordinary skill in the art that the device and technique disclosed herein below has application beyond the current devices disclosed herein and is particularly useful in any context where joint sections are to be tightened and cracked open, particularly contexts where the joints comprise sections of a pipe or rod to be rotated and where a plurality of joint sections are joined and opened in a repetitive manner.

With reference to FIG. 6D, illustrating a device in accordance with an embodiment of the present disclosure and wherein the carriage is in the full forward "stage 2" position, having attached a drill stem 51 to an existing drill string 59 and drilled stem 51 forward on the device, the adapter/stem joint 93 now needs to be cracked or broken open to release the device from drill string 59. FIG. 11A illustrates a wrench element useful in this cracking or breakout step. In the figure, wrench element 85 is a horseshoe wrench having legs or gripping jaws 87 defining a radius 89 dimensioned and adapted to fit over and fit snugly on stem pipe flats component 123, and in particular, stem flats 55. Optionally, wrench element 85 may include a handle 95. The device and method further comprise wrench stop means competent to inhibit rotation of wrench element about the radial axis of the stem joint. In this embodiment a bracket 96 is attached to wall mount 16 substantially above where the pipe joint is positioned in the fully extended stage 2 position. Bracket 96 further comprises a slot 97. FIG. 11A illustrates one useful slot configuration, where slot 97 is created by means of a cross bar 69 that spans the legs 100 of bracket 96. Other useful configurations are within the skill of the art to design and fabricate.

Bracket 96 with slot 97 serves several purposes. First, wrench element 85 and bracket 96 are dimensioned such that wrench element 85 can pass through slot 97 and sit on pipe stem 51 such that its legs or gripping jaws 87 are in contact with the pipe stem's flats 55. The bracket is positioned at a height above the pipe joint such that at least a portion of the top of wrench 85 protrudes up through slot 97. The dimensions of slot 97, determined by the distance between bracket legs 100 and the distance between crossbar 69 and bracket face 124, limits the rotational movement of wrench 85 about the axis of the pipe joint, thereby creating a functional wrench stop. The pipe joint typically is cracked by rotating adapter 32 counter-clockwise, by maneuvering multi-positional lever 44. The wrench stop, with the wrench engaged with pipe stem flat component 123, prevents rotation of drill string 59 while stem adapter 32 is being rotated, allowing the joint seal to be broken. In this disclosure, where the pipe joint is composed of adapter 32 and a stem pipe section 51, the joint is referenced herein as joint 93. Where the pipe joint is composed of two stem pipe sections 51, the joint is referenced herein as joint 111.

When a drill string is being retrieved, a joint 93 between pipe stem adapter 32 and drill string 59 first is cracked open as described above. Collar 34 then is engaged with joint 93, and carriage 20 is moved back to its full re-set position as described in Example 3 below, bringing with it pipe string 59 so that the next proximal forward pipe joint 111 is available to the drill stem joint wrench breakout system. Wrench 85 then is used to crack open this joint 111 so that newly exposed pipe stem 51 can be easily unthreaded from both stem adapter 32 and the drill string 59. Thus, bracket 96 and slot 97 together provide the means for limiting rotational movement of wrench 85 and therefore of stem pipe 51, when wrench 85b is engaged with stem pipe 51, allowing the joint seal to be broken.

Bracket 96 also can provide a means for storing wrench 85 when not in use. Optionally, bracket 96 can be magnetized, for example at position 98 on cross bar 69 allowing wrench 85 to be removably attached to bracket 96 when not in use. It will be appreciated that the magnet position can be varied, and may even include positioning the magnet on the wrench itself and more may include more than one magnet, as desired.

EXAMPLES

Example 1

One example for setting up and breaking down a hand-portable directional drill 10 now is described. In this example, the drill is being delivered to a basement interior which is the launch site for directional drilling to a destination access pit outside, typically at a distance in the range of about 70-250 ft away. Chassis component 11, with foot plate 14 attached, and power/drive component 18 are independently hand-carried into the building and down any necessary stairs to arrive at the launch site. Using standard equipment, a hole is now or has been drilled into the exterior basement wall to access the underground drill bore start site. Chassis component 11 then is lined up to the drill bore start site such that drill bit hole 36 is centered about the drill bore start site. Floor plate 14 is removed from chassis component 11 and power/drive component 18 is slid over the back end of chassis 12 through carriage 20 and cuff 19, then floor plate 14 is re-attached to chassis component 11. Directional drill 10 can be leveled by changing the thread position of pin 64 relative to chassis bolt 74. Wall mount plate 16 is secured to the basement wall by means of standard concrete bolts 35, such as 0.75-in redhead concrete bolts, drilled through bolt holes 106 on wall plate 33. If desired, wall mount floor plate 31 further can be anchored to the floor by drilling bolts into one or more notches 116 that may be provided along the perimeter of plate 31. Similarly, floor plate 14 optionally can be secured to the floor by means of one or more bolts drilled into notches 116 that may be provided on the perimeter of plate surface 67. A desired number of drill stems are provided or have been provided to the launch site. In this example, drill stems are 1-meter length stems with standard male and female joint ends, referred to herein as pin and box ends respectively, and have a bore diameter in the range of about 0.375-inches. A hydraulic power source and pressurized water for drill bit lubrication also are supplied, along with other standard tools and equipment of standard and typical use in directional drilling. If wrench element 85 is not already provided to directional drill 10 e.g., by magnetic connection to wrench stop 96, it is provided now. Drilling now can commence. Once drilling and drill stem retrieval is complete, directional drill 10 easily is disassembled by reversing the steps described above and transporting the components out of the building.

Example 2

In this example, a process for adding drill stems to create a drill string is described using the directional drilling device of the present disclosure.

Example 2A

Process for Providing a Drill Head to Create an Underground Drill Bore Hole An operational drilling device 10 is provided, optionally set up, for example, as described in Example 1 above. A drill head first is attached to stem pipe adapter 32 and wrench flats on the drill bit head are aligned with the flats on adapter 32. Preferably, the drill head comprises an angled blade or bit, means for receiving lubricant from a drill stem central bore, a transmitter or locator beacon (e.g., sonde) component, and an above-ground operator and means are provided for remotely directing the path of the drill head. Remotely directed drill heads are well characterized in the art and are not described in further detail here. Once the drill head is attached to adapter 32, a drill joint 93 is formed. Carriage 20 is positioned in the stage 1 position and cuff 19 is moved to engage with pin hole 27 at stage 2 thereby extending hydraulic piston rod 54. Optionally, carriage 20 and cuff 19 can be positioned prior to attaching the drill bit head. Carriage 20 then is moved forward towards the stage 2 position and drilling commenced by manipulating multi-positional lever or joystick 44 to move carriage 20 forward and rotate the drill head. Typically, drilling occurs with a clockwise rotation, or with the same rotation that maintains threaded engagement between adapter 32 and a drill stem pin end 53. The drill bit head passes through drill bit hole 36 in wall mount 16 and begins drilling a substantially lateral bore hole through the earth. The drill head is lubricated throughout the drilling process by means of lubricant, eg., water, provided through port 88 on water coupler housing 86, typically by means of a quick-connect valve 66. Water passes through port 88 into cavity 102 in housing 86 where it accesses the drill stem bore or channel through opening 78 in shaft 76. Once fork collar 21 on carriage 20 engages with bolt 23 on cuff 19 at the stage 2 position, the drill bit head has been fully fed into the drill bore opening. Wrench element 85 is released from its storage position on wrench stop 96 and legs or gripping jaws 87 engaged with the wrench flats 55 on drill stem flats component 123. Joint 93 then is cracked open by rotating drill adapter 32 in the counter-clockwise direction by manipulating joystick 44, and the drill bit head component disengaged from adapter 32 by continued counter-clockwise rotation. Wrench 85 then is returned to a storage position on wrench stop 96. Once adapter 32 is disengaged from the drill head, cuff 19 can be disengaged from stage 2 pinhole 27 and the whole assembly 18 slid back manually to the stage 1 position, with the hydraulic piston rod 54 collapsed in its barrel 56. Pin 4 of cuff 19 is engaged with pinhole 13. From here, carriage 20 is moved back to a full "re-set" stage 0 position by manipulating joystick 44, extending hydraulic piston rod 54 from its barrel 56.

Example 2B

Adding a Stem Pipe Section to Build a Drill String

Directional drilling device 10 now is ready to add a stem pipe section to the drill bit head in position in the drill bore hole and begin building drill string 59. Box end 57 of a pipe stem section 51 typically first is threaded onto the exposed pin end of the drill bit head protruding from wall mount drill hole opening 36 forming a stem pipe joint 111. Then pin end 53 of stem pipe 51 is threaded into adapter 32 to form a joint 93, preferably wherein flats on both joint components are aligned forming joint 93. Joint 93 can be formed by moving carriage 20 and its attached power/drive assembly forward and rotating stem adapter 32 clockwise by manipulating joystick 44, to engage adapter 32 with pin end 53. Carriage 20 and its attached power/drive assembly then are moved further forward along chassis 12, feeding pipe stem 51 and drill string 59 into the bore hole, until fork collar 21 on carriage 20 engages with bolt 23 on cuff 19 and hydraulic piston rod 54 is fully collapsed into barrel 56. Cuff 19 then is moved to the stage 2 position by pulling lever 2, disengaging pin 4 from pinhole 13 and moving cuff 19 and pin 4 to pinhole 27, again extending hydraulic piston rod 54 from barrel 56 in the process. Carriage 20 and its attached assembly again move forward along chassis 12, drilling newly formed drill string 59 into the borehole until fork collar 21 again engages bolt 23 on cuff 19 and hydraulic piston rod 54 is fully collapsed again into barrel 56. Adapter/stem pipe joint 93 now is at the wall mount plate, in position with the stem joint wrench breakout system. Wrench element 85 is released from its storage position on wrench stop 96 and legs or jaws 87 are engaged with the wrench flats 55 on the drill stem end. Joint 93 then is cracked open, eg., by rotating drill adapter 32 in the counter-clockwise direction by manipulating joystick 44 and drill string 59 is disengaged from adapter 32 by continuing the counter-clockwise rotation. Wrench 85 is returned to a storage position on wrench stop 96. Cuff 19 now is disengaged from stage 2 pinhole 27 and the whole assembly 18 is slid back manually to the stage 1 position where pin 4 on cuff 19 engages pinhole 13, with the hydraulic piston rod 54 collapsed in its barrel 56. From here, carriage 20 is moved back to a full "re-set" stage 0 position by manipulating joystick 44, extending hydraulic piston rod 54 from its barrel 56. Directional drilling device 10 now is ready to add additional drill stem sections 51 to the developing drill string by repeating the steps described here in Example 2B.

Example 3

In this example a process for retrieving a drill string is described. Once a drill string has been created and a bore hole drilled underground to an intended destination, the drill string is retrieved. Typically the drill head has been drilled to a destination access pit, the drill head removed, and a cable, duct, or pipe attached to the front of the drill string to be threaded back through the bore hole underground as the drill string is retracted. Once the cable, pipe or duct is attached, retrieval of the drill string begins. As will be appreciated by those having ordinary skill in the art, a reamer head could be added to the front of the drill string, before attaching the cable, duct or pipe as desired. In this case, however, a drill bit hole 36 on wall mount 16 would need to be provided having dimensions sufficient to accommodate the reamer head.

Example 3A

Removing the First Stem Pipe Section

Directional drill 10 is in the stage 2 position, with stem adapter 32 forming a joint 93 with pin end 53 of the last stem section 51 in drill string 59, and hydraulic piston rod 54 is fully collapsed in cylinder barrel 56. Wrench element 85 is released from its storage position on wrench stop 96. Wrench legs or gripping jaws 87 are engaged with wrench flats 55 on stem section 51. Joint 93 then is cracked open, eg., by rotating drill adapter 32 in the counter-clockwise direction by manipulating joystick 44, and wrench stop bracket 96/slot 97 hold wrench 85 in place, breaking the joint seal. Wrench 85 then is returned to its resting position and collar 34 is moved laterally forward over adapter/stem joint 93, engaging the joint to prevent premature unthreading of the now loosened joint. Carriage 20 then is moved back to its stage 1 position by manipulating joystick 44, retracting drill string 59 and proximal section 51 out of the bore hole until hydraulic piston rod 54 is fully extended out of barrel 56 at the stage 1 position. Cuff 19 then is returned to the stage 1 position to collapse hydraulic piston rod 54 back into its barrel 56, thereby re-staging the cylinder, and carriage 20 is moved back again along chassis 12 until it is in the full back "re-set" or stage 0 position. This step completes extraction of the front end of stem pipe section 51 from the bore hole and through drill hole 36, exposing a first stem section joint 111 to be cracked open. Wrench element 85 is released from its storage position on wrench stop 96 and wrench legs or gripping jaws 87 are engaged with wrench flats 55 on the pin end 61 of drill string 59. Newly exposed section joint 111 then is cracked open as described above, ie., by rotating drill adapter 32 in the counter-clockwise direction by manipulating joystick 44. Collar 34 is moved laterally back off its joint 93 and pipe section 51 is unthreaded from both stem adapter 32 and the pin end 61 of the drill string.

Example 3B

Removing Subsequent Stem Pipe Sections

Carriage 20 now is moved forward to join cuff 19 at the stage 1 position, re-staging the hydraulic cylinder by collapsing hydraulic piston rod 54 back into barrel 56. In this position, fork collar 21 engages bolt 23 on cuff 19. Lever 2 now is pulled to disengage pin 4 from pinhole 13 and both carriage 20 with its attached power/drive unit, together with cuff 19, manually can be slid forward along chassis 12 until pin 4 in cuff 19 engages pin hole 27 in the stage 2 position. Adapter 32 now can be threaded onto pin end 61 of the exposed drill string 59 to form a joint 93 with what is now the distal stem in the drill string. Collar 34 is moved laterally forward to engage with this new joint 93. Carriage 20 then is moved back to its stage 1 position by manipulating joystick 44, retracting drill string 59 and exposing a section 51 out of the bore hole until hydraulic piston rod 54 is fully extended out of barrel 56 at the stage 1 position. Cuff 19 then is returned to the stage 1 position to collapse hydraulic piston rod 54 back into its barrel 56, thereby re-staging the cylinder, and carriage 20 again moved back again along chassis 12 until it is in the full back "re-set" or stage 0 position. This step completes extraction of the front end of a newly exposed stem pipe section 51 from the bore hole and through drill hole 36, exposing a new stem section joint 111 to be cracked open. Wrench 85 is released from its storage position on wrench stop 96 and wrench legs or gripping jaws 87 are engaged with wrench flats 55 on the pin end 61 of drill string 59. Newly exposed section joint 111 then is cracked open as described above, ie., by rotating drill adapter 32 in the counter-clockwise direction by manipulating joystick 44. Collar 34 is moved laterally back off its joint 93 and pipe section 51 is unthreaded from both stem adapter 32 and the pin end 61 of the drill string. Subsequent pipe sections 51 can be removed from the drill string by repeating the steps outlined in this Example 38.

Example 4

One example of a spindle assembly is described. Spindle or shaft 76 can have an overall length in the range of about 5.0-6.5 inches, shaft 76's length being selected to match that of housing 86. Useful outer diameters for shaft 76 can be in the range of about 1.7-2.0 inches and again are selected to accommodate inner cavity 103 dimensions of housing 86. Useful inner spline diameters 75 for shaft 76 accommodate and engage splines 68 of motor 62. Useful such diameters are in the range of about 1.0-1.2 inches. Housing 86 may have an overall outer diameter in the range of about 3.37-4.62 inches, more typically in the range at least about 4.0-4.3 inches. Useful radial wall thicknesses of housing 86 can be in the range of about 0.125-0.25 inches. Optional housing frame 79 provides a means for stabilizing rotary drive unit 24 in frame 118 and has dimensions to accommodate positioning housing 86 in frame 118. Useful frame 79 dimensions can be substantially equal lengths and widths in the range of about 5-6 inches and have a wall thickness in the range of about 0.25-1.0 inches. As illustrated in FIG. 1B, housing frame 79 can be stabilized in frame 118 by means of sleeves 117 into which frame 79 fits. A range of suitable housing materials can be used, as will be appreciated in the art. Choosing an aluminum material, particularly a high strength aluminum, provides a housing 86 of substantially low weight. One useful material includes 70/75 aluminum.

Example 5

One example of a drill stem joint wrench system or wrench breakout system is disclosed herein for use with a directional drilling device. As will be appreciated by those having ordinary skill in the art, other configurations and dimensions are within the skill of the art to design and fabricate once provided with the present disclosure. In the example, wrench element 85 has a substantial horseshoe wrench shape, and an overall length in the range of about 6-10 inches, and even 7-9 inches. For application on a 0.75-1.0-inch drill stem pipe flat 55, wrench legs or jaws 87 are in the range of about 3-4 inches, typically in the range of about 1.5-1.7 inches, and have a radius 89 dimensioned for a snug fit; for example in the range of about 0.8 inches, or an overall diameter in the range of about 0.16 inches. Wrench element 85 also has a handle 95 defined by an opening in the wrench body, with dimensions suitable for easy gripping. Useful dimensions include an opening with a length in the range of about 1-3 inches, and a width in the range of about 0.5-2 inches. A wrench stop bracket 96 is integrally mounted to wall mount 16 and extends out from the wall mount in a perpendicular orientation to the wall plate for a distance in the range of about 2-5 inches or even 3-4 inches. Useful widths for stop bracket 96 are in the range of about 4-7 inches, including 5-6 inches. Useful widths are wide enough for easy passage of wrench 85 through the bracket and narrow enough to provide a functional stop for wrench 85 to prevent its rotation about the stem pipe radial axis while breaking open the pipe stem joint. Bracket 96 also includes a crossbar 69 creating slot 97 to minimize movement of wrench 85 along the longitudinal axis of the pipe stem while also acting as rotational stop. In this example, the drill stem joint wrench system is magnetized by means of at least one magnet, typically a rare earth magnet, positioned, for example, on crossbar 69 and of sufficient magnetic strength to removably attach wrench 85 to crossbar 69 when placed in its vicinity. Magnet 98 can be placed on either the front or back face of crossbar 69. In the present example magnet 98 is located substantially at the center of the front face of crossbar 69. A useful magnet is a ⅜-inch N50 rare earth magnet, also known as a neodymium magnet.

Example 4

One example of a magnetized lock nut or wrench collar is described below for application in a directional drilling device. In this example collar 34 has an overall length in the range of about 2.7-3.5 inches, more typically in the range of about 3-inches, and has an outer diameter in the range of about 2.2-2.7 inches. Collar 34's inner diameter has parallel, mutually opposing flats that run the length of the collar and have a width substantially equal to that of the wrench flats on a stem pipe section, typically in the range of 0.7-1.0 inches. At its widest, collar 34's inner diameter generally can be in the range of about 1.70-2.0 inches, more typically in the range of about 1.75-1.85 inches. As will be appreciated by those having ordinary skill in the art, collar 34's inner dimensions provide enough clearance to allow collar 34 to slide on and off a pipe joint 93 and also to fit closely or snugly enough to prevent substantial rotational movement or torquing between the pipe joint members when collar 34 is removably engaged with joint 93. In this example, collar 34 is made of a heat-tempered stainless steel, such as 17/4 stainless steel, and its outer surface is textured, for example by cross-hatching, to enhance gripping during operation. In this example collar 34 also includes 2 magnets on the collar's outer circumference, diametrically opposed, e.g., at 180° to one another, about the collar's circumference. Useful magnets 90 can be ⅜-inch (0.375-inch) N50 magnets, also known as rare earth or neodymium magnets, and magnets of stronger and weaker strength also are contemplated.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. A directional drilling device suitable for drilling a substantially horizontal bore hole underground through a wall from within a building interior, the device comprising two detachable, hand-portable components:
   (a) a stationary chassis component comprising a wall mount plate and a single longitudinal beam extending perpendicular therefrom, said wall mount plate comprising a drill bore aperture and means for removably securing said plate to a wall underground contiguous with the ground through which a said bore hole is to be drilled, such that said beam extends into said building interior from said wall when said wall plate is mounted to said wall, and
   (b) a carriage component removably coupled to said chassis component and competent to move forward and back along said beam between at least two limiting positions, said carriage component comprising
   a hydraulic rotary drive unit for drilling an attached drill stem having a drill head with an angled drill bit and locator beacon through said drill bore aperture;
   hydraulic directional movement means for moving said carriage component along said beam between said two limiting positions, and
   hydraulic valving means for directing rotation of a said attached drill stem and movement of said carriage component along said beam.

2. The device of claim 1 wherein said directional movement means comprises a single hydraulic cylinder barrel and a piston rod extendable from said barrel.

3. The device of claim 2 wherein said cylinder barrel is attached to said carriage component and the anterior end of said piston rod comprises moveable coupling means for attaching said rod to said beam at one or more positions along said beam such that hydraulic retraction of said rod into said barrel moves said carriage along said beam.

4. The hand-portable device of claim 3 wherein said piston rod moveable coupling means comprises a retractable pin for engaging at least one pinhole positioned on said beam.

5. The hand-portable device of claim 4 wherein said beam comprises two said pinholes.

6. The device of claim 1 wherein said chassis component further comprises a removable foot plate attached to the free end of said beam.

7. The device of claim 1 wherein said chassis component further comprises a removable back plate attached to the free end of said beam for use in a pit-launch drilling application.

8. The device of claim 1 wherein said wall mount plate further comprises means for securing said plate to the floor.

9. The hand-portable device of claim 1 wherein said device weighs in the range of about 185 to 200 pounds.

10. The hand-portable device of claim 1 wherein said chassis component weighs in the range of about 90 to 100 pounds.

11. The hand-portable device of claim 1 wherein said carriage component weighs in the range of about 90 to 100 pounds.

12. The device of claim 1 wherein said carriage component moves along said beam between three limiting positions.

13. The hand-portable device of claim 1 further comprising a carrying handle.

14. A directional drilling device for drilling a substantially horizontal bore hole underground comprising two detachable, hand-portable components:
   (a) a chassis component comprising a wall mount plate and a single beam extending perpendicularly therefrom, said wall mount plate comprising a drill bore aperture and means for removably securing said plate to a wall underground, and
   (b) a carriage component comprising a coupling means for removably coupling said carriage component to said beam and sliding said carriage along said beam, a hydraulic power unit, a rotary drive unit for rotating an attached drill stem having a drill head with an angled drill bit and locator beacon, a directional drive unit for moving said carriage component along said beam, and a valving unit for directing power to said rotary drive and directional drive units, said directional drive unit comprising a single hydraulic cylinder barrel and piston rod extendable therefrom, and means for movably positioning said rod on said beam to extend said piston rod out from said barrel.

15. The hand-portable device of claim 14 wherein said movably positioning means on said rod comprises a retractable pin for engaging at least one pinhole positioned on said beam.

16. The hand-portable device of claim 14 wherein a foot plate is removably attached to the free end of said beam.

17. The hand-portable device of claim 14 wherein a back wall plate is removably attached to the free end of said beam for bracing said device against the back wall of an excavated launch pit.

18. The hand-portable device of claim 14 wherein said chassis component and said carriage component each weighs in the range of about 90 to 100 pounds.

19. A method for directional drilling a bore hole underground along an intended path from within a building interior underground, the method comprising the steps of:
   (a) providing a bore hole opening in a wall underground, said wall being contiguous with the ground through which said bore hole is to be drilled;
   (b) hand-carrying a hand-portable directional drilling device to said building interior underground, the device comprising two detachable, hand-portable components:
      (i) a stationary chassis component comprising a wall mount plate and a single longitudinal beam extending perpendicular therefrom, said wall mount plate comprising a drill bore aperture and means for removably securing said plate to said wall containing said bore hole opening, such that said beam extends into said building interior from said wall when said wall plate is mounted to said wall, and
      (ii) a carriage component comprising a coupling means dimensioned to pass over the free end of said beam and slide along said beam, a hydraulic rotary drive and power unit for rotating an attached drill stem, a hydraulic directional drive and power unit for moving said carriage component along said beam by said coupling means, and a valving unit for directing power to said rotary drive and directional drive units,
   (c) attaching said wall mount plate to said wall such that said aperture is centered about said bore hole opening;
   (d) placing said carriage component at a start position on said beam to allow attachment of a drill stem or drill head to said rotary drive unit;
   (e) attaching a foot plate to the free end of said beam;
   (f) attaching a drill head having an angled drill bit and locator beacon to said rotary drive unit;
   (g) providing hydraulic power to said directional drive means to move said carriage component forward along said beam until said carriage component reaches said wall mount plate and said drill head is in said bore hole opening, the back end of said drill head defining the first component of a drill string to be built;
   (h) detaching said rotary drive unit from said drill string;
   (i) moving said carriage means back along said beam to said start position;
   (j) threading a drill stem onto said rotary drive unit;
   (k) providing hydraulic power to said directional drive means to move said carriage component forward along said beam until the free front end of said drill stem reaches said drill string;
   (l) providing hydraulic power to said rotary drive unit to thread said drill stem on said drill string;
   (m) providing hydraulic power to said directional drive component until said carriage component reaches said wall mount plate and said drill stem is in said bore hole opening, the back end of said drill stem defining the next component of a drill string to be built;
   (n) repeating steps (h)-(m) until the bore hole is complete.

20. The method of claim 19 wherein said chassis component and said carriage component are carried separately.

21. The method of claim 19 wherein said wall is a concrete wall.

22. A method for directional drilling a bore hole underground along an intended path from within a building interior underground, the method comprising the steps of:
   (a) providing a bore hole opening in a wall underground, said wall being contiguous with the ground through which said bore hole is to be drilled;
   (b) providing a drill head having an angled drill bit and locator beacon in said bore hole opening, the back end of said drill head defining the first component of a drill string to be built;
   (c) providing a directional drilling means to said bore hole opening, said drilling means comprising two detachable, hand-portable components:
      (i) a chassis component attached to said wall by means of a wall mount plate comprising a drill bore aperture dimensioned to surround said drill bore opening and through which said drill string is accessible, said chassis component comprising a single longitudinal beam extending perpendicularly from said wall mount into said building interior, said beam comprising a first and second position pinhole, and
      (ii) a carriage component comprising a hydraulic power unit, a rotary drive unit for rotating an attached drill stem, a hydraulic directional drive unit for moving said carriage component along said beam by a coupling means, and a valving unit for directing power to said rotary drive and directional drive units, said directional drive unit comprising a single hydraulic cylinder barrel and a piston rod extendable therefrom, said piston rod comprising a retractable pin for engaging said pinholes;
   (d) placing said carriage component at a start position on said beam by said coupling means to allow attachment of a drill stem to said rotary drive unit;
   (e) attaching a drill stem to said rotary drive unit;
   (f) placing said retractable pin in said first position pinhole to extend said piston rod from said barrel;
   (g) providing hydraulic power to said directional drive means to move said carriage component forward along said beam towards said wall until said drill stem reaches said drill string;
   (h) providing hydraulic power to said rotary drive unit to thread said drill stem to said drill string;
   (i) providing hydraulic power to said directional drive means to move said carriage component forward along said beam towards said wall until said rod collapses into said barrel;
   (j) placing said retractable pin in said second position pinhole to extend said piston rod from said barrel;
   (k) continue moving said carriage component forward along said beam until said rod collapses into said barrel and said drill stem is in said bore hole opening, the back end of said drill head defining the first component of a drill string to be built;
   (l) detaching said rotary drive unit from said drill string;
   (m) moving said carriage means back along said beam to said start 10 position; and
   (n) repeating steps (d)-(m) until said bore hole is complete.

23. The method of claim 22 wherein said coupling means comprises a collar dimensioned to slide over the free end of said beam.

\* \* \* \* \*